(12) United States Patent
Shibahara et al.

(10) Patent No.: US 9,336,587 B2
(45) Date of Patent: May 10, 2016

(54) SEMICONDUCTOR CIRCUIT PATTERN MEASURING APPARATUS AND METHOD

(71) Applicant: HITACHI HIGH-TECHNOLOGIES CORPORATION, Tokyo (JP)

(72) Inventors: Takuma Shibahara, Tokyo (JP); Michio Oikawa, Machida (JP); Kei Sakai, Heverlee (BE); Satoru Yamaguchi, Hitachinaka (JP)

(73) Assignee: Hitachi High-Technologies Corporation, Tokyo (JP)

( * ) Notice: Subject to any disclaimer, the term of this patent is extended or adjusted under 35 U.S.C. 154(b) by 277 days.

(21) Appl. No.: 13/868,352

(22) Filed: Apr. 23, 2013

(65) Prior Publication Data

US 2014/0003703 A1    Jan. 2, 2014

(30) Foreign Application Priority Data

Apr. 27, 2012    (JP) .................................. 2012-102042

(51) Int. Cl.
*G06T 7/00* (2006.01)
(52) U.S. Cl.
CPC ..... *G06T 7/0004* (2013.01); *G06T 2207/20016* (2013.01); *G06T 2207/20148* (2013.01); *G06T 2207/30148* (2013.01)
(58) Field of Classification Search
CPC .................. G06T 2207/30148; G06T 7/0004; G06T 7/001; G06K 2209/19; H01L 22/12
See application file for complete search history.

(56) References Cited

U.S. PATENT DOCUMENTS 6,584,236 B1 *    6/2003    Maruo et al. ................. 382/298

FOREIGN PATENT DOCUMENTS

JP    2001-338304 A    12/2001

OTHER PUBLICATIONS

Fukuda et al., Graph Cuts by using Local Texture Features of Wavelet Coefficient for Image Segmentation [on-line], Jun. 23-Apr. 26, 2008[retrieved Aug. 18, 2015], 2008 IEEE Inter Conf on Multimedia and Expo,pp. 881-884. Retrieved from the Internet: http://ieeexplore. ieee.org/xpls/abs_all.jsp?arnumber=4607576&tag=1.*
Hironobu Fujiyoshi "Gradient-Based Feature Extraction SIFT and HOG" Research Paper of Information Processing Society of Japan, CVIM vol. 160, 2007, pp. 211-224.
Hiroshi Ishikawa, "Graph cut", Information Processing Society Research Report, 2007-CVIM-158-(26), pp. 193-204.

* cited by examiner

*Primary Examiner* — Matthew Bella
*Assistant Examiner* — Dennis Rosario
(74) *Attorney, Agent, or Firm* — Mattingly & Malur, PC

(57) ABSTRACT

Included is a multiple resolution image generating unit which applies a plurality of noise removing filters to a semiconductor circuit pattern image and generates a multiple resolution image, a multiple resolution differential image generating unit which generates a multiple resolution differential image from a difference of images between hierarchies of the multiple resolution image, and a contour extracting unit which extracts a contour of the semiconductor circuit pattern based on an intensity signal of the semiconductor circuit pattern image. The contour extracting unit calculates an intensity signal level upon extracting a contour of the semiconductor circuit pattern from the multiple resolution image by using an image signal of the multiple resolution differential image, and extracts a contour of the semiconductor circuit pattern based on the calculated intensity signal level.

11 Claims, 26 Drawing Sheets

INTENSITY PROFILE OF 304

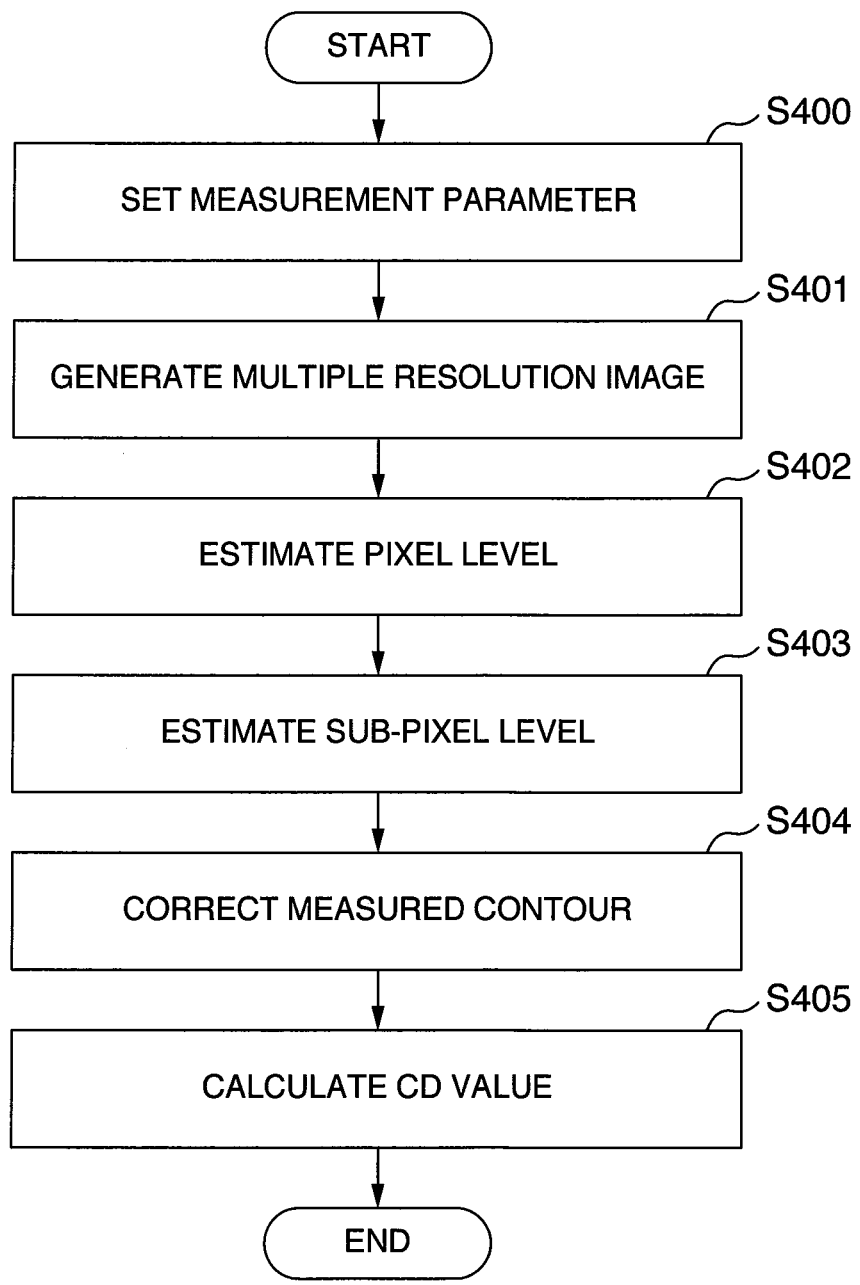

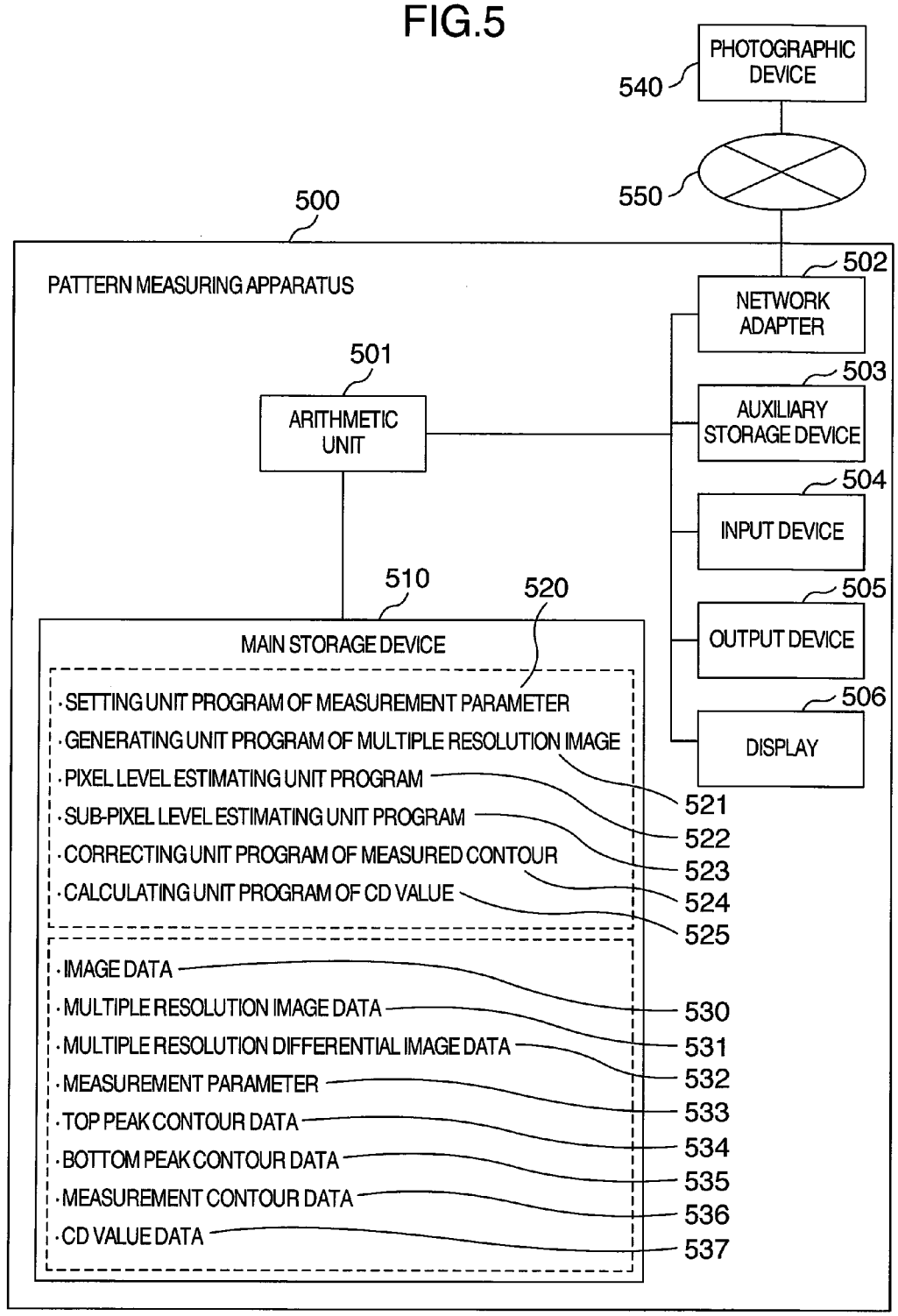

800

701

702

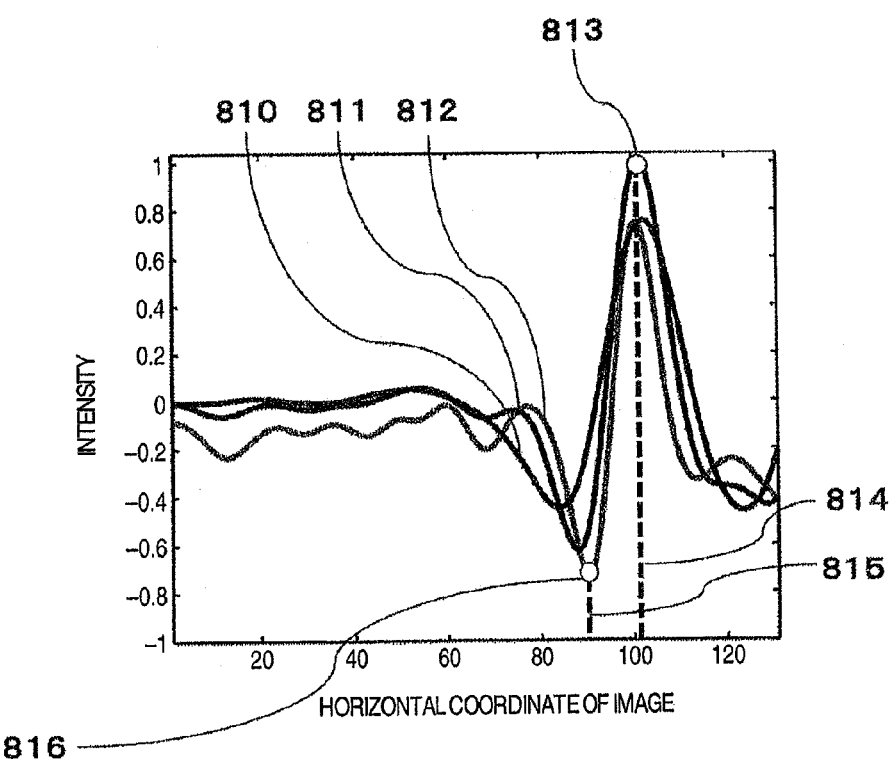

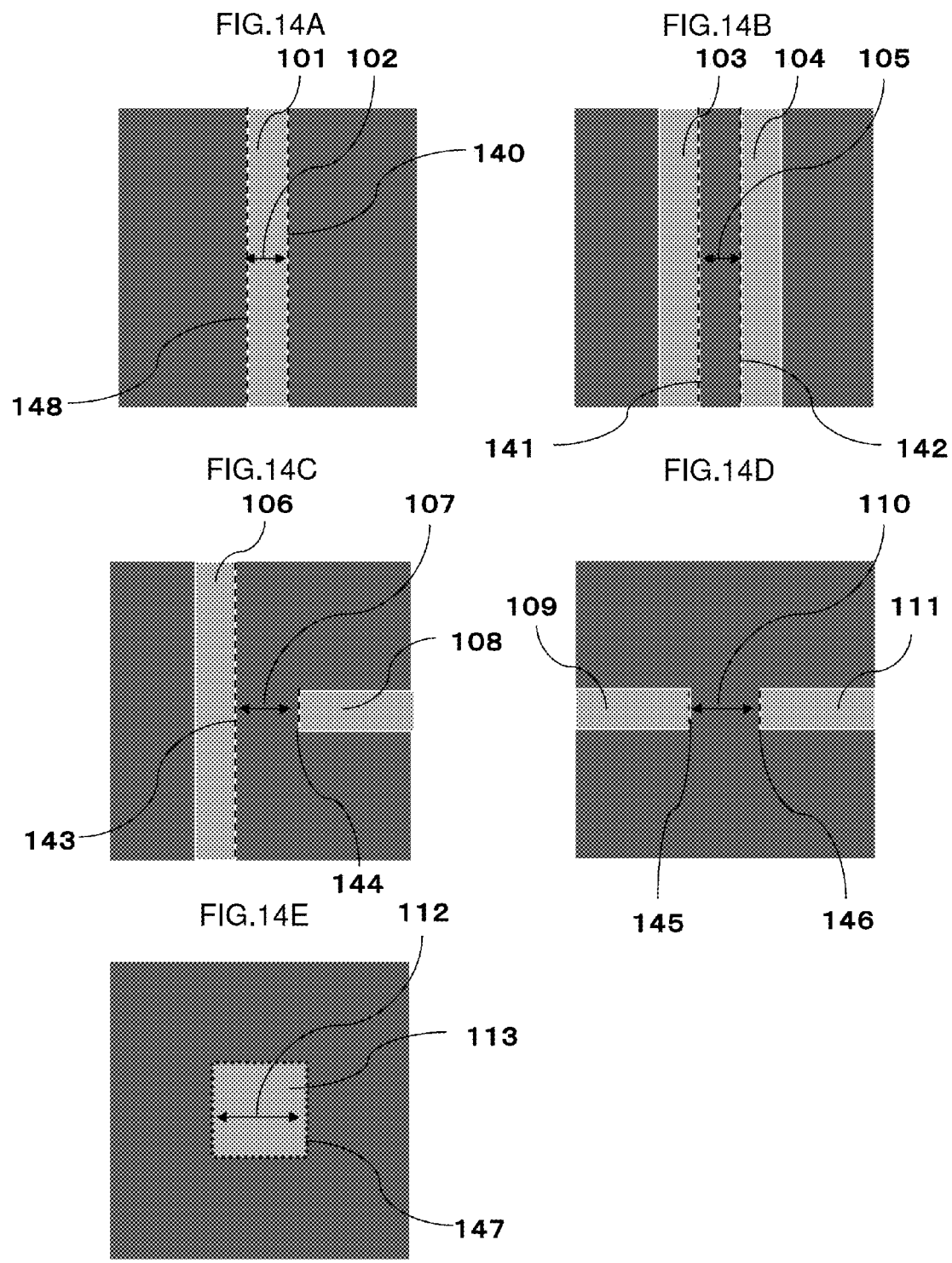

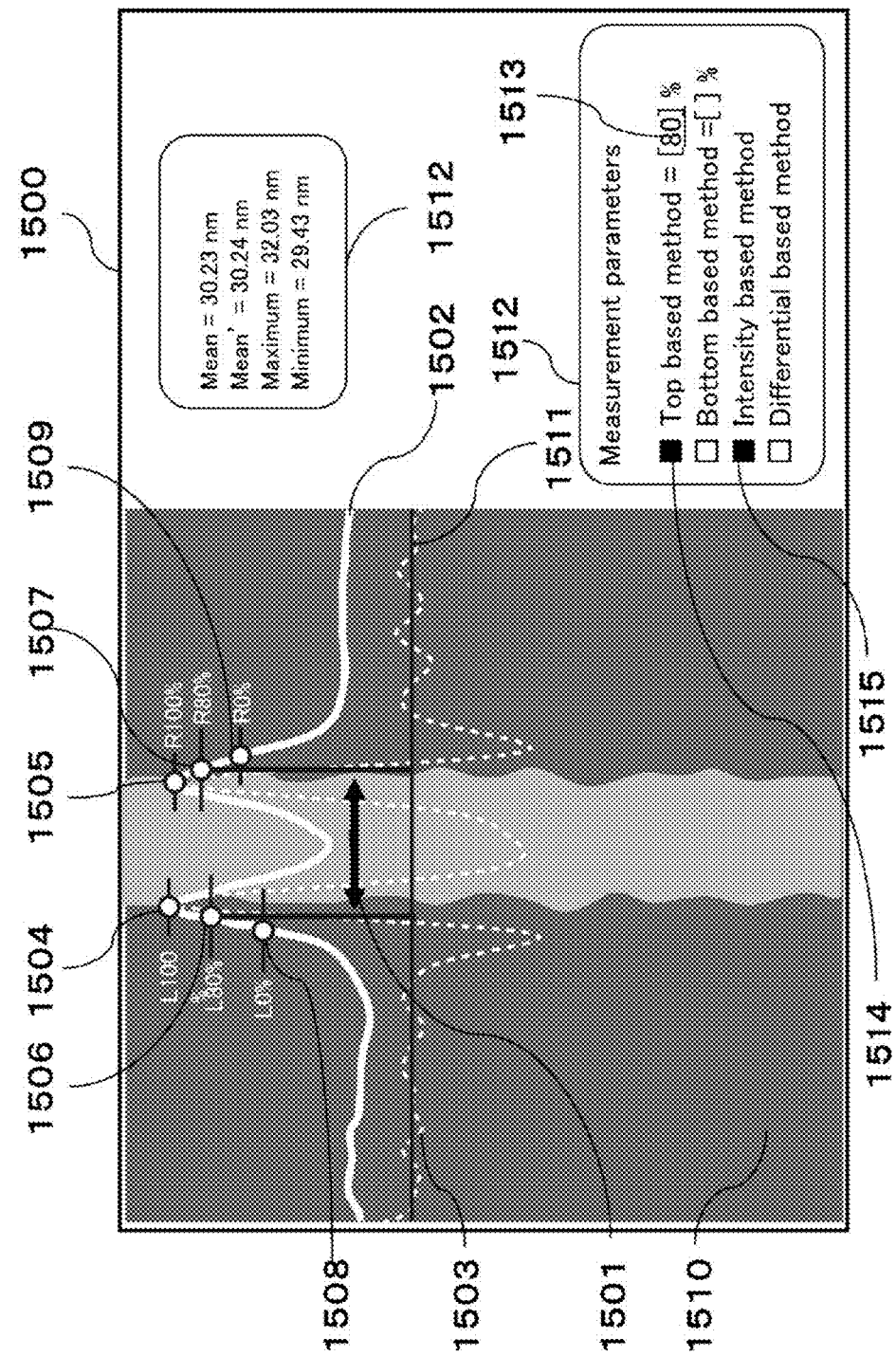

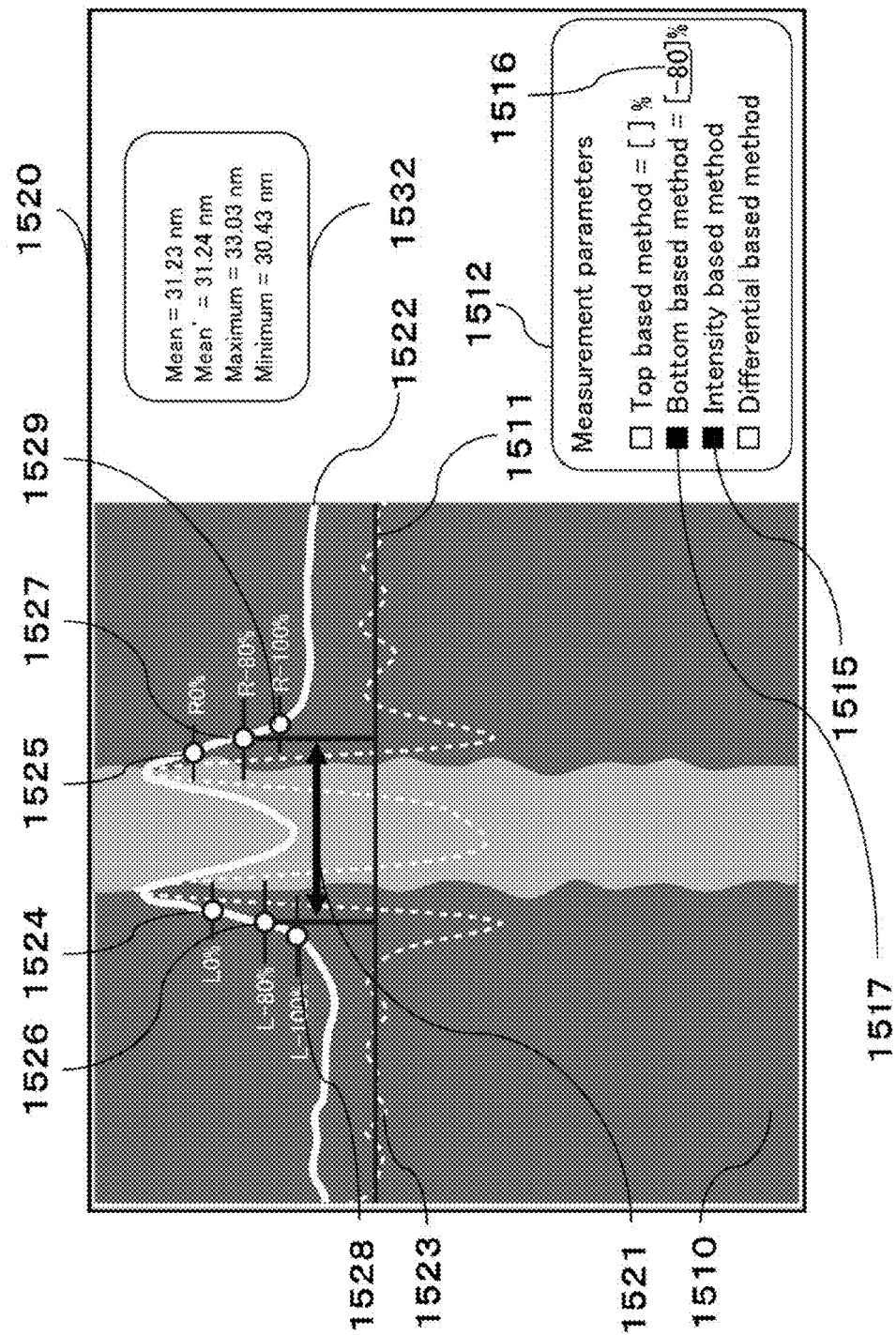

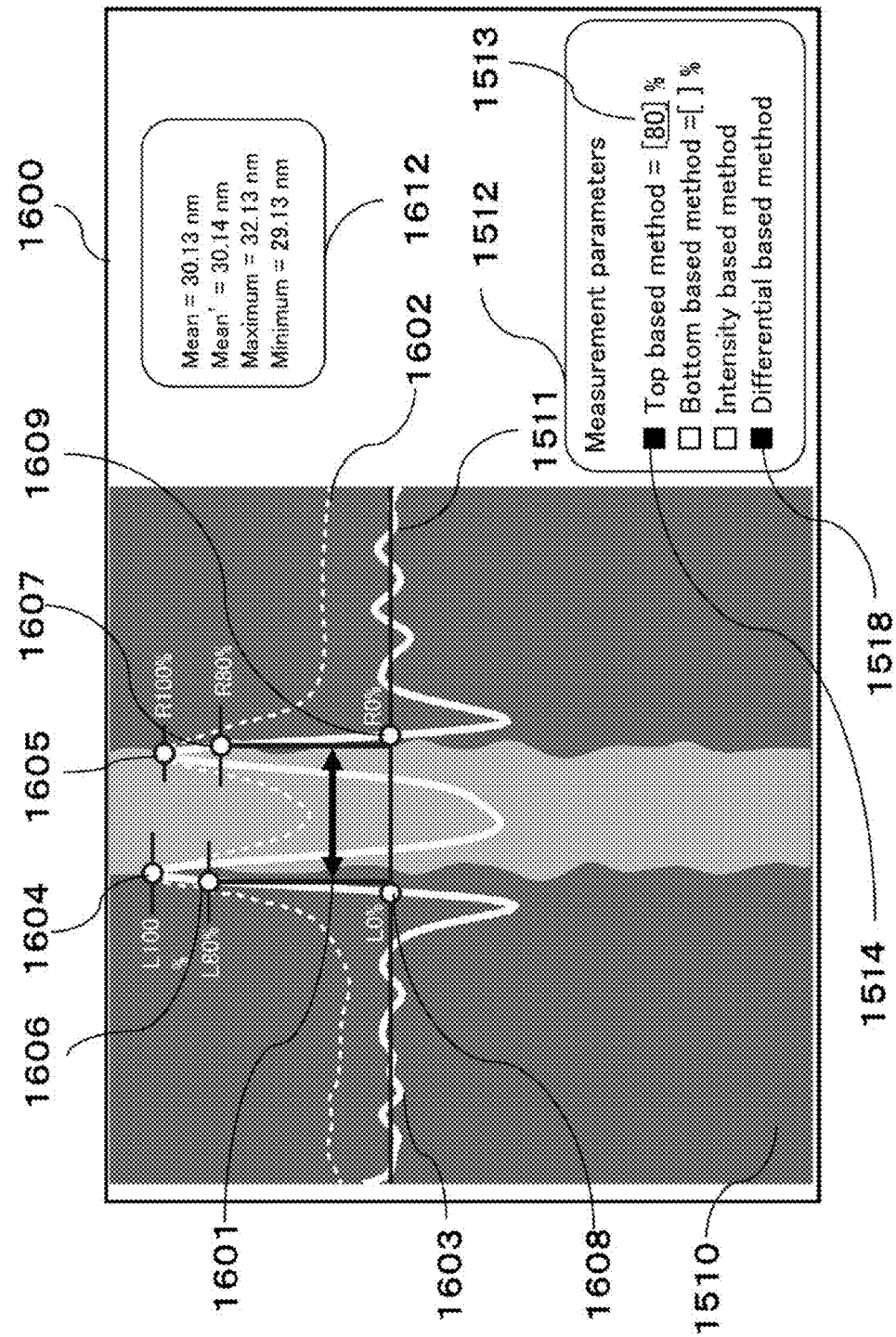

FIG.19B

EVALUATION RESULT OF MEASUREMENT REPRODUCIBILITY

1900

| | THRESHOLD METHOD (CONVENTIONAL TECHNOLOGY) | DIFFERENTIAL BASED MEASUREMENT (EMBODIMENT) | | INTENSITY BASED MEASUREMENT (EMBODIMENT) |
|---|---|---|---|---|
| THRESHOLD (%) | 75 | 0 | 80 (TOP REFERENCE) | 80 (TOP REFERENCE) |
| SMOOTHING (pix) | 19 | 5~11 (HALF BANDWIDTH) | 5~11 (HALF BANDWIDTH) | 5~11 (HALF BANDWIDTH) |
| MEASUREMENT REPRODUCIBILITY (nm) | 0.16 | 0.15 | 0.14 | 0.13 |

SEMICONDUCTOR CIRCUIT PATTERN MEASURING APPARATUS AND METHOD

INCORPORATION BY REFERENCE

The present application claims priority from Japanese application JP2012-102042 filed on Apr. 27, 2012, the content of which is hereby incorporated by reference into this application.

BACKGROUND OF THE INVENTION

The present invention relates to a semiconductor circuit pattern measuring apparatus and a method, and particularly, to an analysis technique of images of semiconductor devices.

In a manufacturing process of a semiconductor device, a size of a circuit pattern such as fine wiring and holes formed on a semiconductor wafer is measured to thereby perform manufacturing control. Contours in a photographic image of the circuit pattern are extracted so as to measure the size of the circuit pattern.

In JP-A-2001-338304, a method called a threshold method is illustrated as a method for extracting contours of a circuit pattern in a photographic image. In this threshold method, by using as a reference a maximum intensity signal in a photographic image, a level slice of an intensity profile is performed with a given threshold so as to calculate the position of a measured contour.

SUMMARY OF THE INVENTION

Through miniaturization in a circuit pattern accompanying by progress of recent exposure technique, an error permissible in manufacturing control is extremely small. Further, here is a situation in which a slight measurement error largely changes a yield rate of products. For example, there is a high possibility that when a measurement error occurs, a product which ought to be originally within a permissible extent is also removed as that out of the permissible extent.

However, in a technology disclosed in JP-A-2001-338304, since a maximum intensity signal is used as a reference, a signal value being a reference tends to be unstable owing to various noises contained in images. An erroneous selection of an intensity peak of the maximum intensity signal is in danger of staggering the extraction of contours in a photographic image of a circuit pattern, enlarging an error as a result, and reducing measurement reproducibility. Since being extremely sensitive to errors due to miniaturization of circuit patterns at present, conventional technologies including the threshold method are in danger of failing to extract contours with sufficient accuracy, and largely changing the yield rate of products.

To solve the above problem, the present invention has the following configuration. Namely, a semiconductor circuit pattern measuring apparatus of the present invention includes a receiver which receives a semiconductor circuit pattern image transmitted from a photographic device, a multiple resolution image generating unit which applies a plurality of noise removing filters to a semiconductor circuit pattern image received by the receiver and generates multiple resolution images, a multiple resolution differential image generating unit which generates a multiple resolution differential image from a difference of images between the hierarchies of multiple resolution images, and a contour extracting unit which extracts contour of the semiconductor circuit pattern based on intensity signals of the semiconductor circuit pattern image. The contour extracting unit calculates intensity signal levels upon extracting the contour of the semiconductor circuit pattern from the multiple resolution images by using image signals of the multiple resolution differential images, and extracts the contour of the semiconductor circuit pattern based on the calculated intensity signal levels.

According to the present invention, the semiconductor circuit pattern measuring apparatus reduces the extraction error of the contours of a circuit pattern in a photographic image and reduces the influence on the yield rate of products.

Other objects, features and advantages of the invention will become apparent from the following description of the embodiments of the invention taken in conjunction with the accompanying drawings.

BRIEF DESCRIPTION OF THE DRAWINGS

FIG. 4 shows an outline of a pattern measurement process flow according to an embodiment of the invention;

FIG. 5 illustrates one example of a configuration of a pattern measuring apparatus according to an embodiment of the invention;

FIGS. 8A and 8B illustrate a pixel level estimation of a measured contour;

FIGS. 14A to 14E illustrate a relationship between a measured contour and a CD value;

FIGS. 15A and 15B illustrate a display at the time of measuring a CD value by using an intensity based method;

FIGS. 16A and 16B illustrate a display at the time of measuring a CD value by using a differential based method;

FIGS. 19A and 19B are a diagram and a table in which performances are compared in the case of measuring a CD value by using a measurement system in which a pattern measurement process according to an embodiment of the invention is performed and in the case of measuring a CD value by using a conventional threshold method.

DETAILED DESCRIPTION OF THE EMBODIMENTS

Next, an embodiment for performing the invention (hereinafter, referred to as an embodiment) will be accordingly described in detail with reference to the accompanying drawings.

First, a technology which is an assumption of the present embodiment will be described with reference to FIGS. 1 to 3.

Figure 1A:
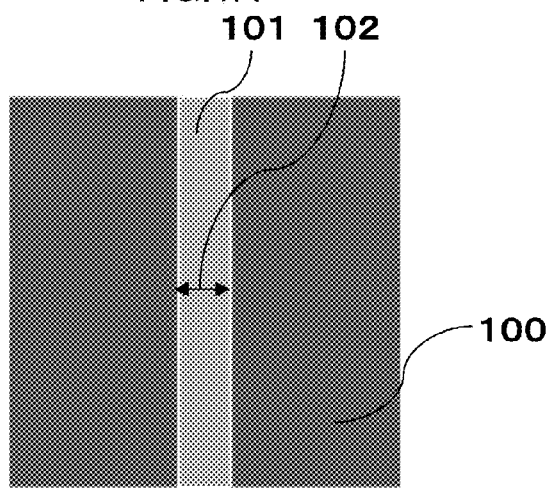
FIGS. 1A to 1E illustrate a CD value (Critical Dimension value) in a semiconductor pattern measurement.
Figure 1B:
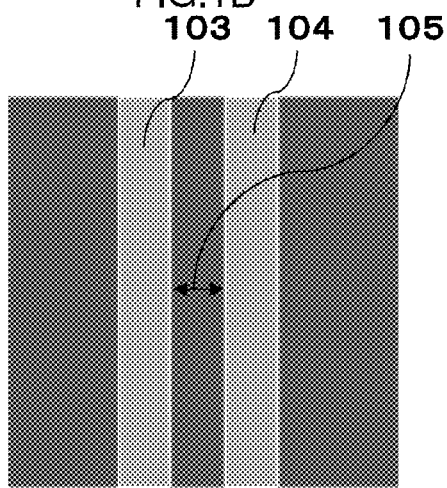
Figure 1C:
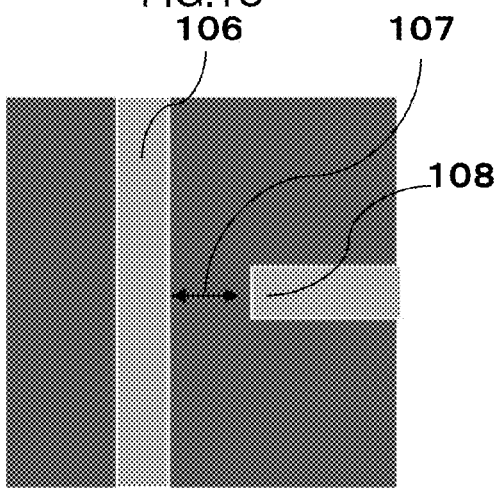
Figure 1D:
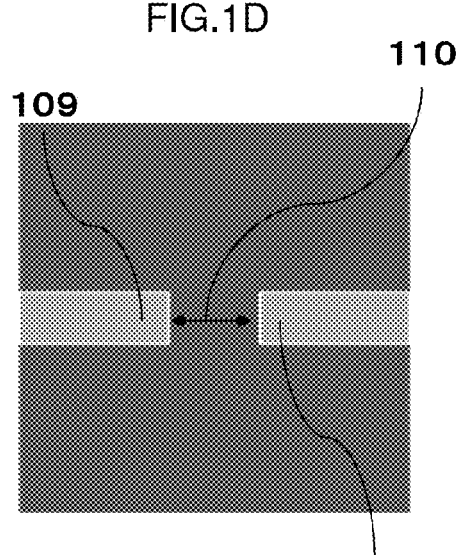
Figure 1E:
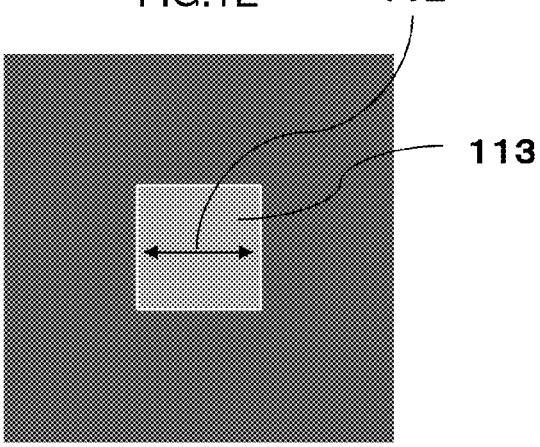

FIGS. 1A to 1E illustrate an example of a circuit pattern such as microscopic wiring and holes formed on a semiconductor wafer. FIG. 1A illustrates a line width 102 of a line 101, FIG. 1B illustrates an inter-line width 105 between lines 103 and 104, FIG. 1C illustrates a width 107 between a line 106 and a line edge 108, FIG. 1D illustrates a width 110 between line edges 109 and 111, and FIG. 1E illustrates a span 112 of a hole 113, respectively.

By using an SEM (scanning electron microscope), for example, semiconductor devices are photographed and images are analyzed as in FIGS. 1A~1E. The above process permits sizes of circuit patterns such as wiring and holes, namely, CD values to be measured. Here, images of the circuit patterns of the semiconductor device are illustrated in FIGS. 1A~1E and an image obtained by photographing a part of FIG. 1A with magnification is illustrated in FIG. 2A.

Figure 2A:
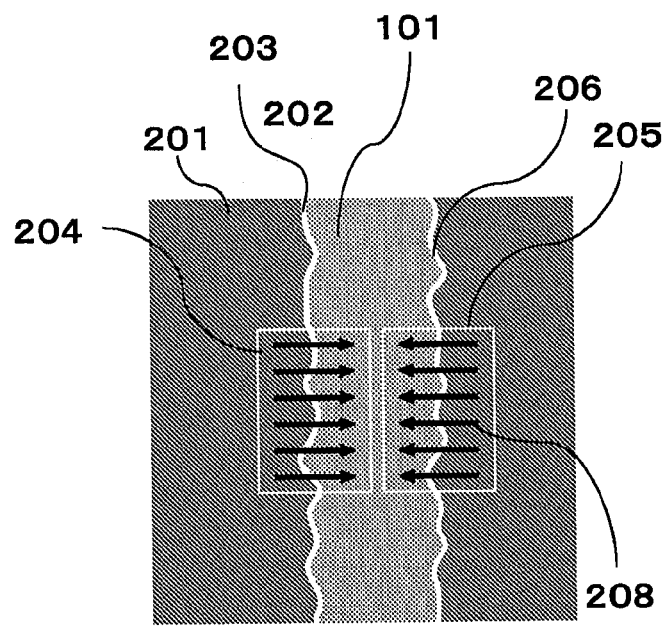
FIGS. 2A to 2C illustrate a two-dimensional position coordinate of a measured contour of a circuit pattern.
Figure 2C:
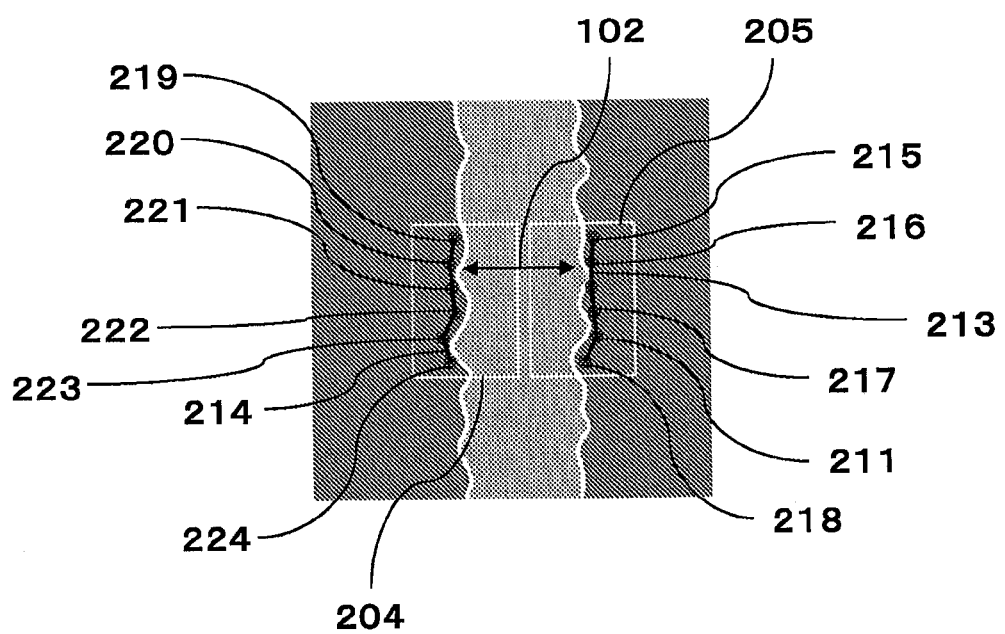
Figure 2B:
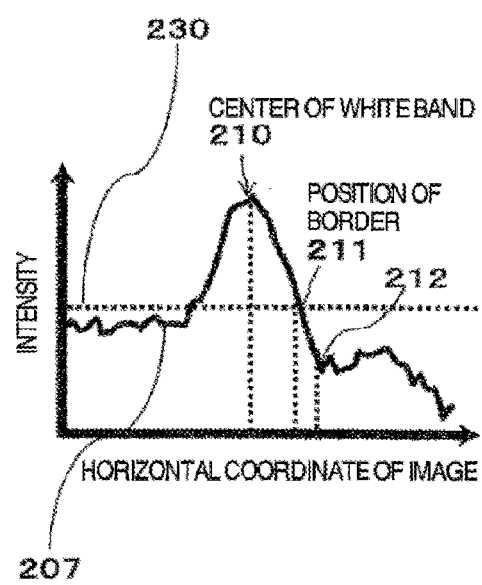

FIG. 2A illustrates an image of the circuit pattern, FIG. 2B illustrates an intensity profile, and FIG. 2C illustrates a position coordinate of a measured contour. When it is supposed that a transfer pattern of semiconductors is photographed by using a microscope such as an SEM or an HIM (helium ion microscope), images are created as in images 203 and 206 (as an intensity value rises up more, images are created from black to white, and therefore the images 203 and 206 are hereinafter called a white band) which are distributed in high intensity in the range of several pixels. An image signal 207 segmented in the direction from a range 205 to a measurement vector 208 is called an intensity profile, and an example thereof is illustrated in FIG. 2B. In FIG. 2B, an intensity value of an image signal is taken in a vertical coordinate and a horizontal coordinate value of an image being a segmentation source is taken in a horizontal coordinate, thus illustrating an intensity profile 207.

In general, the position of the contour in a transfer pattern indicates a position 211 of an intersection point of the intensity profile 207 and an intermediate intensity level 230 of a base 212 of a profile from the neighborhood 211 of the center 210 of the white band. Next, the measured contour and position coordinate thereof will be described with reference to FIG. 2C. The measured contour in the range 205 indicates a concatenation 213 of positions (215, 216, 217, 211, and 218) of respective intensity levels. Similarly, the measured contour in the range 204 indicates a concatenation 214 of positions (219, 220, 221, 222, 223, and 224) of respective intensity levels. On this occasion, a CD value (line width 102) of the wiring 101 of FIG. 2A is given as a distance in the horizontal direction between the measured contours 213 and 214.

However, a position (hereinafter, referred to as an intensity peak) of a maximum intensity signal tends to be unstable due to an influence of various noises contained in images. The above will be described with reference to FIG. 3.

Figure 3A:
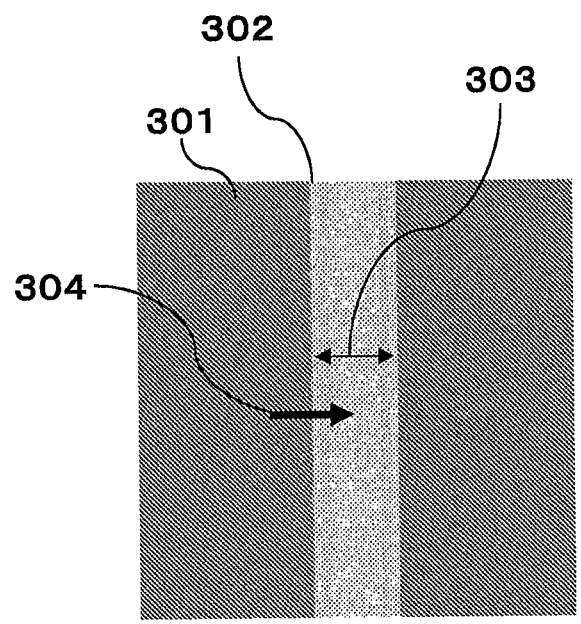
FIGS. 3A and 3B illustrate an influence of noises on an extraction of a measured contour.
Figure 3B:
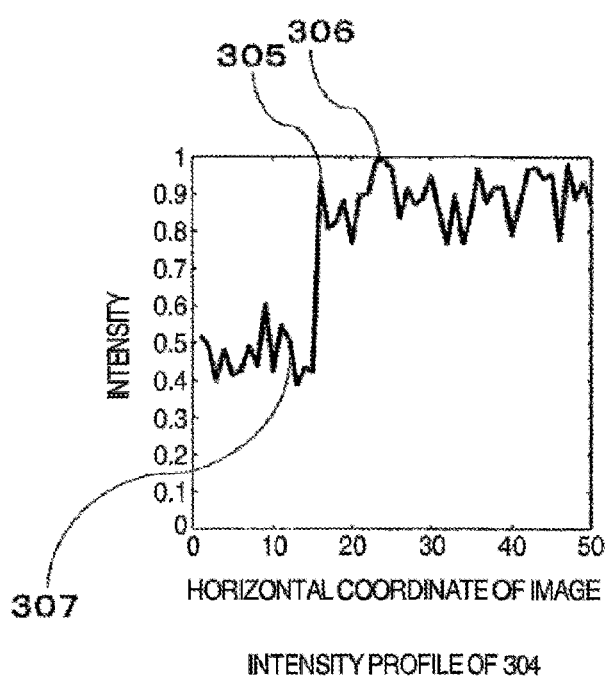
Figure 6A:
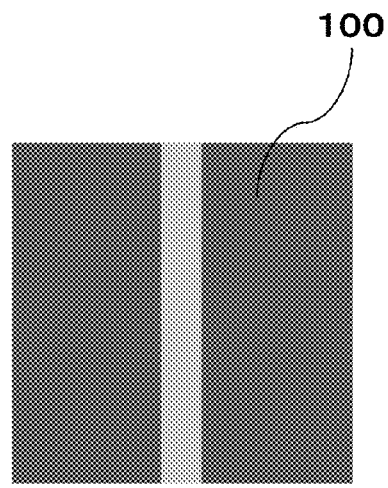
FIGS. 6A to 6D illustrate a calculation example of a multiple resolution image.
Figure 6B:
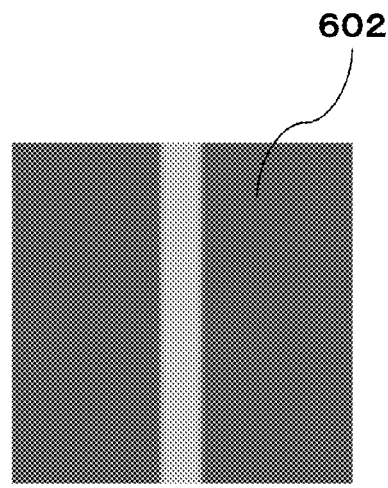
Figure 6C:
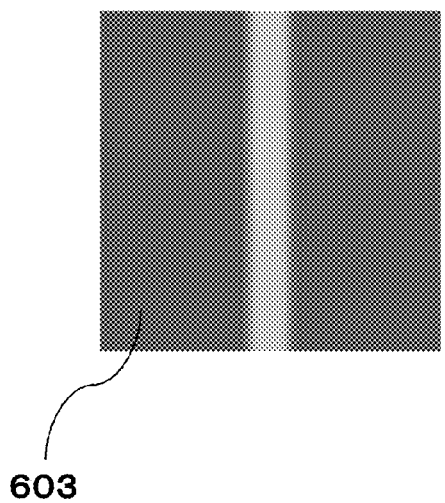
Figure 6D:
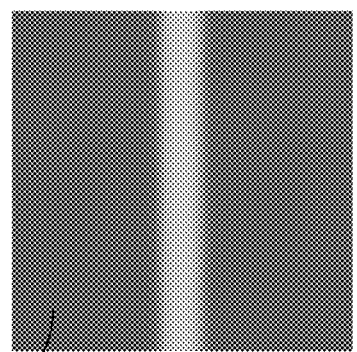

FIG. 3 illustrates one example of an image of a circuit pattern having a lot of noise components of FIG. 3A and an intensity profile thereof of FIG. 3B. An intensity profile obtained from a microscope image 301 in the direction of a measurement vector 304 in FIG. 3A is illustrated by a reference numeral 307 of FIG. 3B. In this case, a plurality of intensity peaks such as 305 and 306 are present in the intensity profile 307. Under such conditions, it is quite unlikely to suitably perform a simple selection of intensity peak in which an intensity value is maximized. When an intensity peak as a reference is erroneously selected in the threshold method, an extraction position of the measured contour is shifted. As a result, measurement reproducibility may be largely reduced.

(Flow of the whole) 4 shows a flow of the whole embodiment of the present invention. First, a process of setting an extraction method of the measured contour is performed (S400: setting of measurement parameter). Next, a multiple resolution image and a multiple resolution differential image are generated from an image in which a circuit pattern is photographed (S401: generation of multiple resolution image). A top peak contour and a bottom peak contour are then calculated with pixel accuracy from an intensity profile of the multiple resolution differential image (S402: pixel level estimation). Subsequently, the measured contour of an arbitrary intensity level is estimated with sub-pixel accuracy based on the top peak contour and bottom peak contour with pixel accuracy obtained at the step 402 (S403: sub-pixel level estimation). From the measured contour obtained at the step S403, a part (hereinafter, an erroneously detected part of the measured contour is referred to as a flyer or an outlier, and a correctly detected part is referred to as an inlier) of the measured contour erroneously detected is further detected and corrected (S404: correction of measured contour). Finally, a CD value of the circuit pattern is calculated from the measured contour (S405: calculation of a CD value). As described above, in the present embodiment, when the process of a flowchart of FIG. 4 is performed, the measured contour and the CD value of the circuit pattern are obtained.

(Configuration of pattern measuring apparatus) A configuration of a pattern measuring apparatus which performs the process of the present embodiment will be described with reference to FIG. 5.

As illustrated in FIG. 5, the pattern measuring apparatus 500 includes an arithmetic unit 501, a main storage device 510, a network adapter 502, an auxiliary storage device 503, an input device 504, an output device 505, and a display 506. In the pattern measuring apparatus 500, a photographic device 540 is connected to the main storage device 510 via a network 550 so as to receive image data 530. The photographic device 540 includes a microscope (SEM, HIM, and TEM (transmission electron microscope)) having a resolution of the order of sub-nanometer or more. The auxiliary storage device 503 includes an HDD (hard disk drive) and an SSD (solid state drive). The input device 504 includes a track ball, a keyboard, a scanner, and a DVD drive. The output device 505 includes a printer and a DVD-RW drive. The display 506 includes a liquid crystal display.

The arithmetic unit 501 is a CPU (central processing unit) of a computer. The unit 501 executes a program developed in the main storage device 510 configured by DRAMs (dynamic random access memory), thereby implementing various functions.

In the main storage device 510, a setting unit program 520 for a measurement parameter, a generating unit program 521 for a multiple resolution image and a multiple resolution differential image, a pixel-level estimating unit program 522, a sub-pixel-level estimating unit program 523, a correcting unit program 524 for a measured contour, and a calculating unit program 525 for CD value are stored. Here, the pixel-level estimating unit program 522, the sub-pixel-level estimating unit program 523, the correcting unit program 524 for a measured contour, and the calculating unit program 525 for CD value may be considered as a contour extracting unit or a contour extraction program in a broad sense.

In the main storage device 510, the image data 530, multiple resolution image data 531 having a plurality of images, a multiple resolution image data 532 having a plurality of differential images, a measurement parameter 533, top-peak contour data 534, bottom-peak contour data 535, measured contour data 536, and CD value data 537 are held. In addition, between the main storage device 510 and the auxiliary storage device 503, transmission and reception are performed so as to hold the consistency of programs and data, and various programs and data are stored therein.

(Details of each step in the present embodiment) Hereinafter, each step of FIG. 4 will be described sequentially. In the description of each step, as an example, there will be described a process of measuring the line width 102 as the CD value of the line 101 in the image 100 of FIG. 17A. Finally, as illustrated in FIG. 2C, a point group (215 to 224) constituting the measured contour is generated in each measurement vector from the setting ranges 204 and 205. In the case of the image 100 of FIG. 17A, the line width 102 is measured as the CD value.

(Operation of Pattern Measuring Apparatus)

(S400: Setting Unit of Measurement Parameter)

There will be described a setting process of the measurement parameter at step S400 of the flowchart of FIG. 4. Hereinafter, there will be described a process flow of the setting unit program 520 of the measurement parameter executed by the arithmetic unit 501.

Figure 16B:
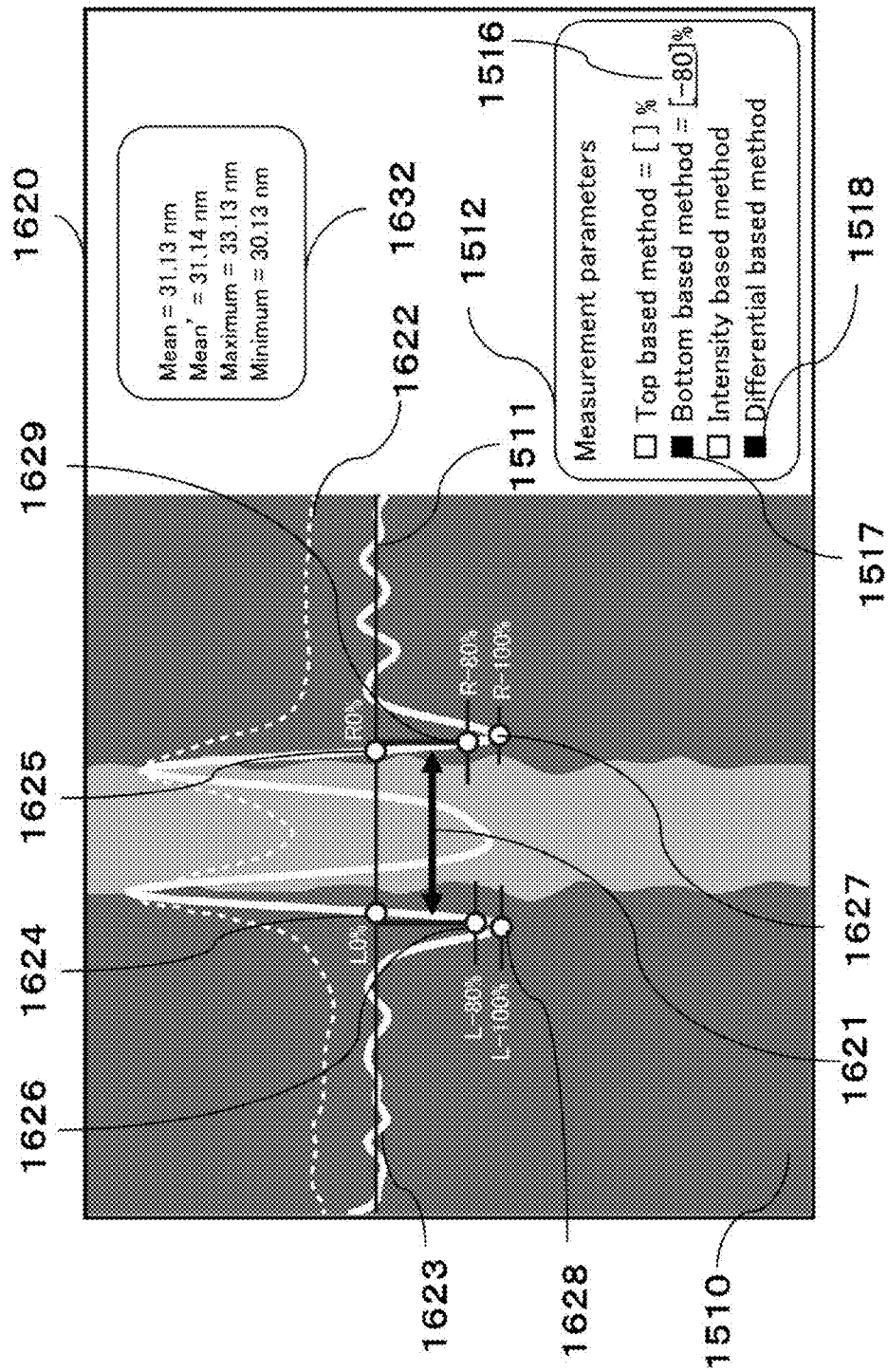

On the display 506, a setting window 1512 illustrated in FIGS. 15A, 15B, 16A, and 16B is displayed. Details will be described later. FIGS. 15A, 15B and 16A illustrate a CD value calculated from the measured contour obtained by using as a reference a top peak and a middle point, and FIGS. 15A, 15B and 16B illustrate a CD value calculated from the measured contour obtained by using as a reference a bottom peak and a middle point.

Check boxes 1514, 1517, 1515, and 1518 (hereinafter, referred to as a selection box) for selecting a measurement method are used. Intensity level boxes 1513 and 1516 for inputting a parameter of an intensity level are further used. The selection boxes 1514, 1517, 1515, and 1518 and the intensity level boxes 1513 and 1516 enable inputting a check or a value from the input device 504. Input values are stored as a measurement parameter 533 in the main storage device 510 and the auxiliary storage device 503.

(S401: Generation Process of Multiple Resolution Image)

There will be described a generating unit of the multiple resolution image of step S401 in the flowchart of FIG. 4. Previously, the data 530 about the image 100 is supposed to be obtained via the network 550 from the SEM 540, and stored in the main storage device 510 and the auxiliary storage device 503. Hereinafter, there will be described a process flow of the generating unit program 521 about the multiple resolution image executed by the arithmetic unit 501.

Figure 17A:
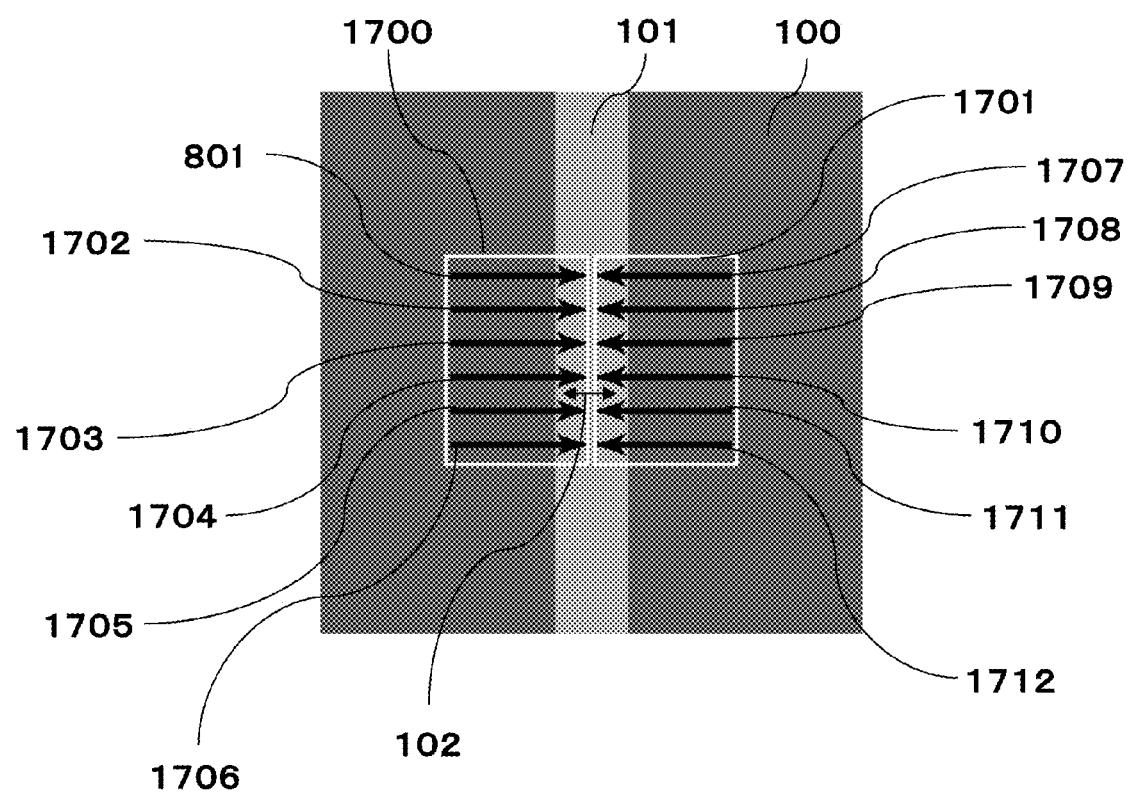
FIGS. 17A and 17B each illustrate a measurement process of a CD value.
Figure 17B:
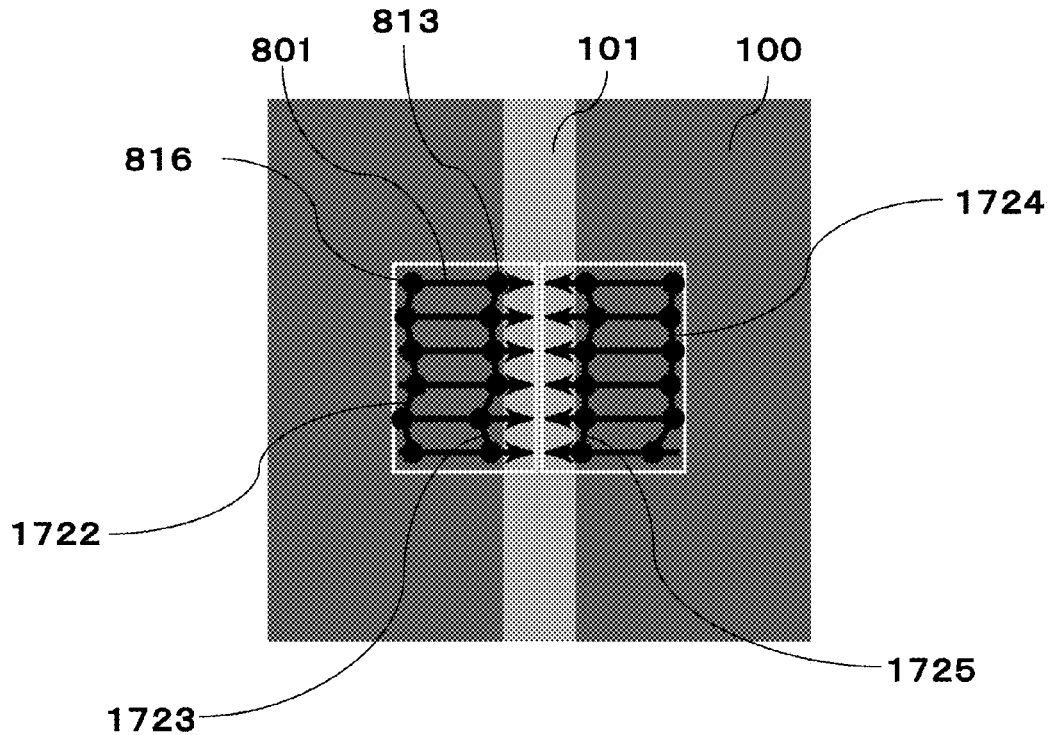

First, a plurality of noise removing filters is applied to the image 100 of FIG. 17A. Examples of the noise removing filter include a Gaussian filter represented by the following formula.

(MATH. 1)

$$g(x, y, \sigma_k) = \frac{1}{2\pi\sigma_k^2}\exp\left\{-\frac{x^2 + y^2}{2\sigma_k^2}\right\} \quad (1)$$

Here, x and y each represents an index in the horizontal and vertical directions of images, and σk (k=0, 1, . . . , K) represents a half-width of a Gaussian filter. By changing the size of σk with a small pitch (e.g., 0.01 pixel pitch), a multiple resolution image is generated. That is, when noise removing filters each having a different parameter are used, images to which a plurality of different noise removing filters are applied are generically named a multiple resolution image.

An image in which a Gaussian filter of the size σk is convoluted is represented by the following formula.

(MATH. 2)

$$I(x,y,\sigma_k) = G(x,y,\sigma_k)*I(x,y,0) \quad (2)$$

Here, I(x, y, σ₀) is set to be equal to I(x, y, 0) and is defined as an original image I(x, y, 0) without filtering. In FIG. 6, an example of a multiple resolution image is illustrated in the case of K=3. FIGS. 6A to 6D illustrate calculation examples of I(x, y, σ₀=0), I(x, y, σ₁), I(x, y, σ₂), and I(x, y, σ₃) (illustrate 100, 602, 603, and 604 in sequence), respectively.

Here, a calculation of the formula (2) is considered to represent a process in which a value of the size σk is considered as the time, and as the size σk more increases, an intensity signal is more dispersed. Accordingly, a time differential image I'(x, y, σk) of the image I(x, y, σk) is represented by the following formula.

(MATH. 3)

$$I'(x,y,\sigma_k) \simeq I(x,y,\sigma_k+\epsilon) - I(x,y,\sigma_k) \quad (3)$$

Here, ε represents a temporal differential coefficient, and is preferably set to a minute value (one pixel or less) from a standpoint of calculation accuracy.

Figure 7A:
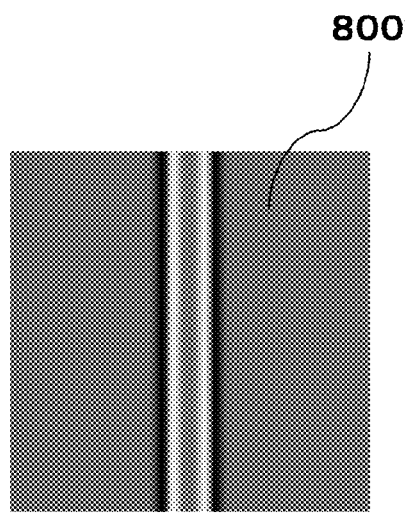
FIGS. 7A to 7C illustrate a calculation example of a multiple resolution differential image.
Figure 7B:
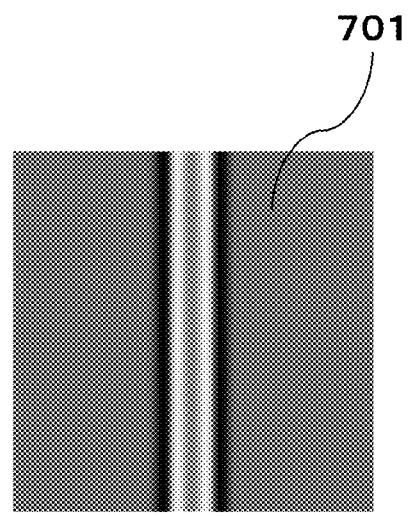
Figure 7C:
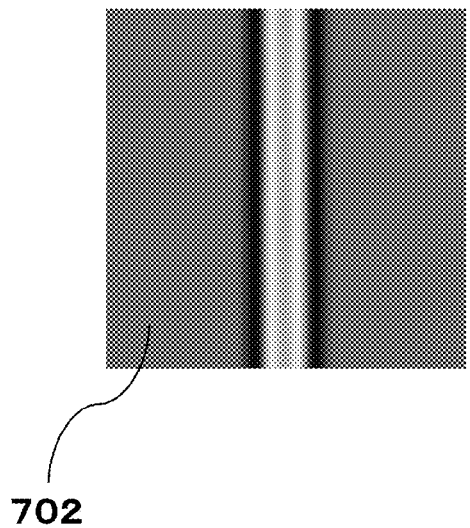

From a standpoint of simplicity of descriptions in the present embodiment, when simply referring to "differential", time differential according to a calculation method of the formula (3) is supposed to be represented unless otherwise specified. Similarly, also when referring to "differential image", a time differential image is supposed to be represented. In FIG. 7, an example of the multiple resolution differential image is illustrated in the case of K=3. FIGS. 7A to 7C illustrate calculation examples of I'(x, y, σ1), I'(x, y, σ2), and I'(x, y, σ3) (illustrate 800, 701, and 702 in sequence), respectively. A plurality of images in which time differential is applied to each image illustrated in FIG. 6 are generically named the multiple resolution differential image. As indicated in (Hironobu Fujiyoshi: "Gradient-Based Feature Extraction SIFT and HOG" Research Paper of Information Processing Society of Japan, CVIM vol. 160, 2007, pages 211-224), a calculation may be performed as a formula (4) for the purpose of reducing calculation cost.

(MATH. 4)

$$I'(x,y,\sigma_k) \simeq I(x,y,k\sigma_k = \sigma_k+1) - I(x,y,\sigma_k) \quad (4)$$

As shown in Hironobu Fujiyoshi: "Gradient-Based Feature Extraction SIFT and HOG" Research Paper of Information Processing Society of Japan CVIM vol. 160, 2007, pages 211-224), when features of the next formula are used in addition to the calculation method of the formula (4), an increase in the calculation cost due to an increase in the size σ of the Gaussian filter may be reduced.

(MATH. 5)

$$I(x,y,2\sigma_k) \simeq I_{half}(x,y,\sigma_k) \quad (5)$$

Here, $I_{half}$(x, y, σk) represents an image with a half resolution of I(x, y, σk). As the size a of the Gaussian filter increases, I'(x, y, 2σk) is accordingly calculated by using $I_{half}$(x, y, σk), thereby reducing the calculation cost. Through the above process, the data 531 about the multiple resolution image I(x, y, σk) and the data 532 about the multiple resolution differential image I'(x, y, σk) are generated and stored in the main storage device 510 and the auxiliary storage device 503.

(S402: Pixel Level Estimating Unit)

The pixel level estimation process of step S402 in the flowchart of FIG. 4 will be described. It is supposed that the multiple resolution image data 531 and the multiple resolution differential image data 532 are previously developed in the main storage device 510. Hereinafter, there will be described a process flow of the sub-pixel level estimating unit program 522 executed by the arithmetic unit 501.

Figure 8A:
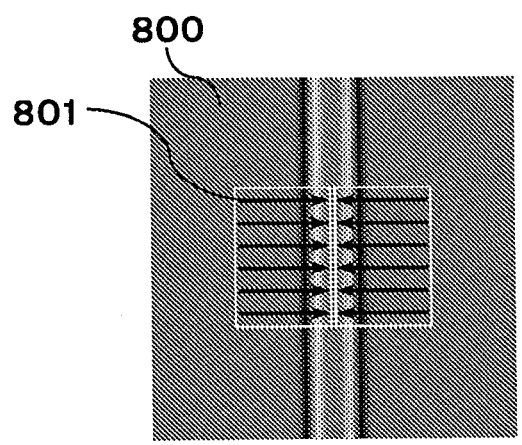

With regard to the intensity profile of the multiple resolution differential image I'(x, y, σk), there will be first described the calculation process of a positive intensity peak position which is maximized in all hierarchies and a hierarchy number thereof, and that of a negative intensity peak position which is minimized in all hierarchies and a hierarchy number thereof. Descriptions will be made with reference to FIG. 17A. Measurement ranges 1700 and 1701 are set and measurement vectors 801, and 1702 to 1712 are arranged. In a subsequent process, descriptions will be made while taking notice of the measurement vector 801. Descriptions will be made with reference to FIG. 8A. K pieces of differential intensity profiles f'(x, y, σk) are extracted from the multiple resolution differential image I'(x, y, σk) in the direction of the measurement vector 801. FIG. 8B illustrates differential intensity profiles (810, 811, and 812) with different resolution. As illustrated in FIG. 8B, the peak height of the differential intensity profile f'(x, y, σk) is different in each resolution of the images according to a value of σk. Subsequently, a peak of the maximal value is called a top peak in the differential intensity profile f'(x, y, σk). When noises of the image are suitably removed in the top peak, a positive peak height of the differential intensity profile f'(x, y, σk) is maximized. Descriptions will be made with reference to FIG. 8B. The top peak is denoted by a reference numeral 813, and a differential intensity profile of resolution in which the top peak 813 is maximized is denoted by a reference numeral 811. Hereinafter, a hierarchy number in which the top peak is maximized is set to "i", and a differential intensity profile thereof is set to "f" (x, y, σi). In general, the top peak has a good S/N (signal-noise ratio) and can be detected robustly to the noises of the image.

The top peak is taken notice of heretofore, and further a minimum peak may be present in a bottom part of the top peak as illustrated in FIG. 8B. Subsequently, such a minimum peak is called a bottom peak. When noises of images are suitably removed in the bottom peak, a negative peak height of the differential intensity profile f'(x, y, σk) is minimized. Descriptions will be made with reference to FIG. 8B. The bottom peak is denoted by a reference numeral 816, and a differential intensity profile of resolution in which the bottom peak 816 is minimized is denoted by a reference numeral 812. Hereinafter, a hierarchy number in which a bottom peak is minimized is set to j, and the extracted intensity profile is set to f(x, y, σj). In an application for measuring a bottom part (in general, corresponding to a dark part in an image) of a circuit pattern, a line near the dark part of the intensity profile needs to be extracted. Accordingly, a method in which a bottom peak near a measurement part is used as a reference is considered to be better than a method in which a top peak is used as a reference.

When the above process is repeatedly performed in all measurement vectors 801, and 1702 to 1712 of the image, the top peak contours 1723 and 1725 are calculated and the data 534 thereof is stored in the main storage device 510 and the auxiliary storage device 503. Similarly, the bottom peak contours 1722 and 1724 are calculated with the pixel accuracy and the data 535 thereof are stored in the main storage device 510 and the auxiliary storage device 503.

(S403: Sub-Pixel Level Estimating Unit)

The sub-pixel level estimation process of step S403 in the flowchart of FIG. 4 will be described. It is supposed that the multiple resolution image data 531, multiple resolution differential image data 532, top peak contour data 534, bottom peak contour data 535, and measurement parameter 533 are developed previously in the main storage device 510. Hereinafter, there will be described a process flow of the sub-pixel level estimating unit program 523 executed by the arithmetic unit 501.

Figure 18:
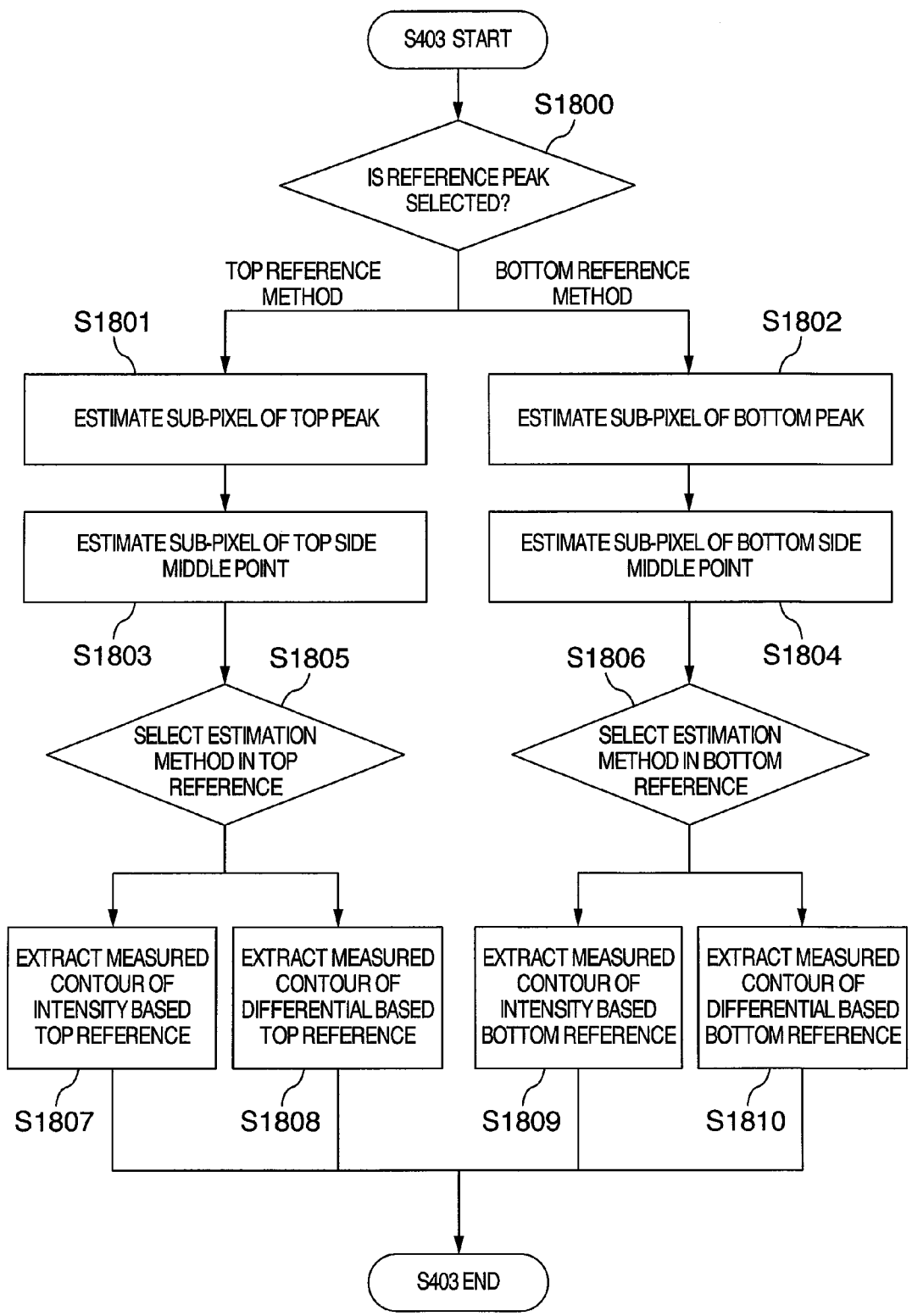
FIG. 18 shows an internal flow of step S404 of a pattern measurement process flow according to an embodiment of the invention.

A flowchart of FIG. 18 illustrates details of the internal process of step S403. Hereinafter, steps S1800 to S1810 of FIG. 18 will be described sequentially. At the step S402, position coordinates of the top peak contours 1723 and 1725 and the bottom peak contours 1722 and 1724 are obtained with the pixel accuracy. Here, a position coordinate value of the top peak is set to $pt_{pix}$, and a position coordinate value of the bottom peak is set to $pb_{pix}$.

(S1800 in S403: Reference Peak Selection)

In a subsequent process, with reference to data of the measurement parameter 533, if the selection box 1514 is checked, the process advances to step S1801 and is performed with a hierarchy number "i". On the other hand, if the selection box 1517 is checked, the process proceeds to step S1802 and is performed with a hierarchy number "j".

(S1801 in S403: Sub-Pixel Estimation of Top Peak)

Figure 10A:
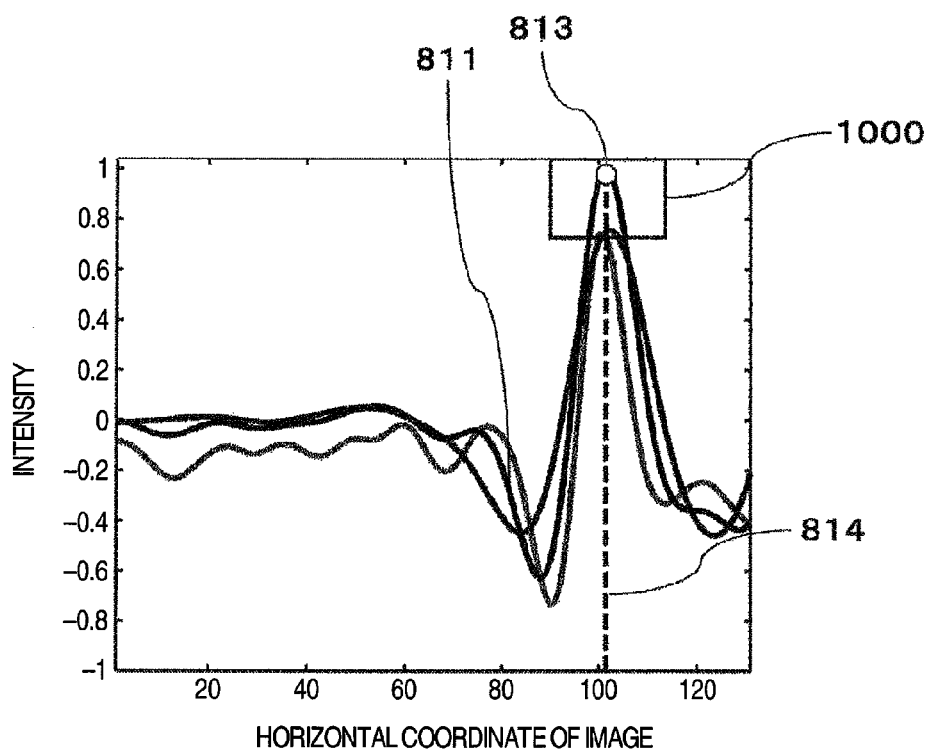
FIGS. 10A and 10B illustrate a sub-pixel position estimation method of a top peak.
Figure 10B:
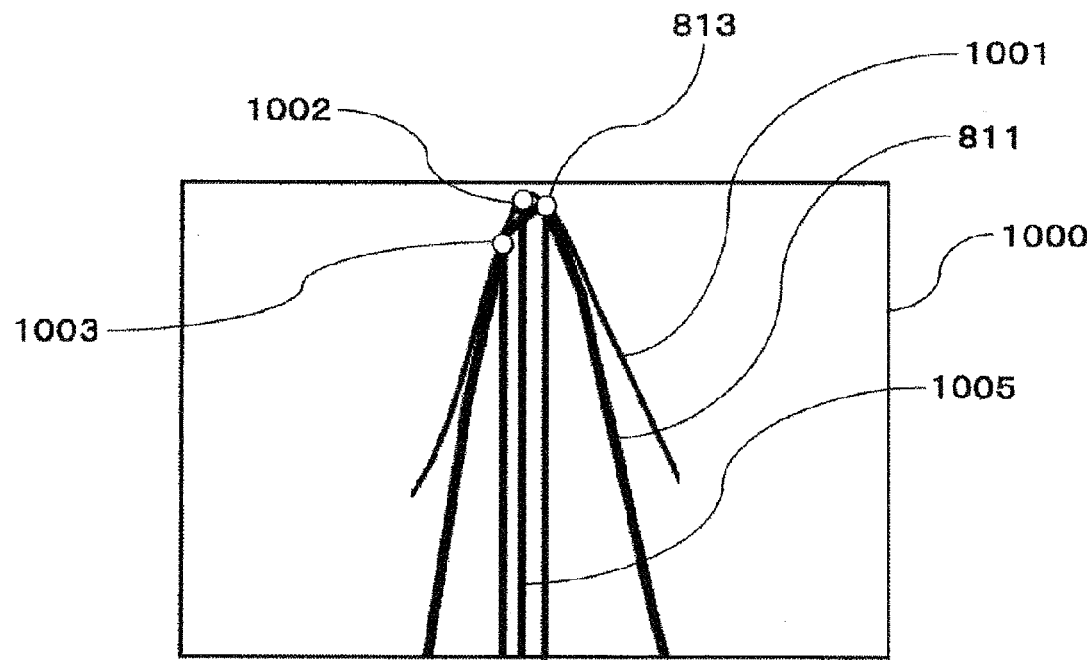

Descriptions will be made with reference to FIG. 10A. FIG. 10A illustrates a multiple resolution differential intensity profile, and FIG. 10B illustrates a sub-pixel position estimation method of the top peak, respectively. Further, FIG. 10B is obtained by enlarging a rectangle 1000 of FIG. 10A.

First, by using as a reference a position coordinate value $pt_{pix}$ of the top peak 813, parabola fitting 1001 is performed to the differential intensity profile f'(x, y, σi) 811. Through the process, a position $pt_{pub}$ of a true top peak 1002 on the differential intensity profile f'(x, y, σi) 811 is estimated with sub-pixel accuracy. Here, descriptions will be made with reference to FIGS. 11A and 12A. The true top peak on the intensity profile f(x, y, σi) 1203 corresponding to the true top peak 1002 on the differential intensity profile f'(x, y, σi) 811 is set to a reference numeral 1201, and similarly the sub-pixel position coordinate value thereof is set to $pt_{pub}$. The process then proceeds to step S1803.

Figure 11A:
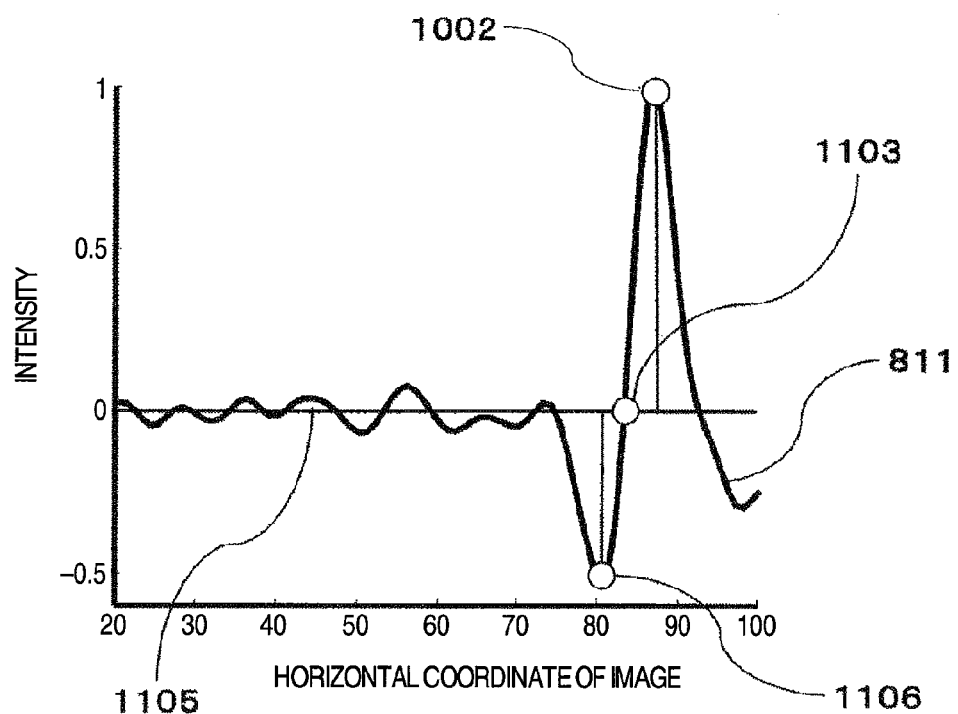
FIGS. 11A and 11B illustrate a sub-pixel position estimation method of a middle point.
Figure 11B:
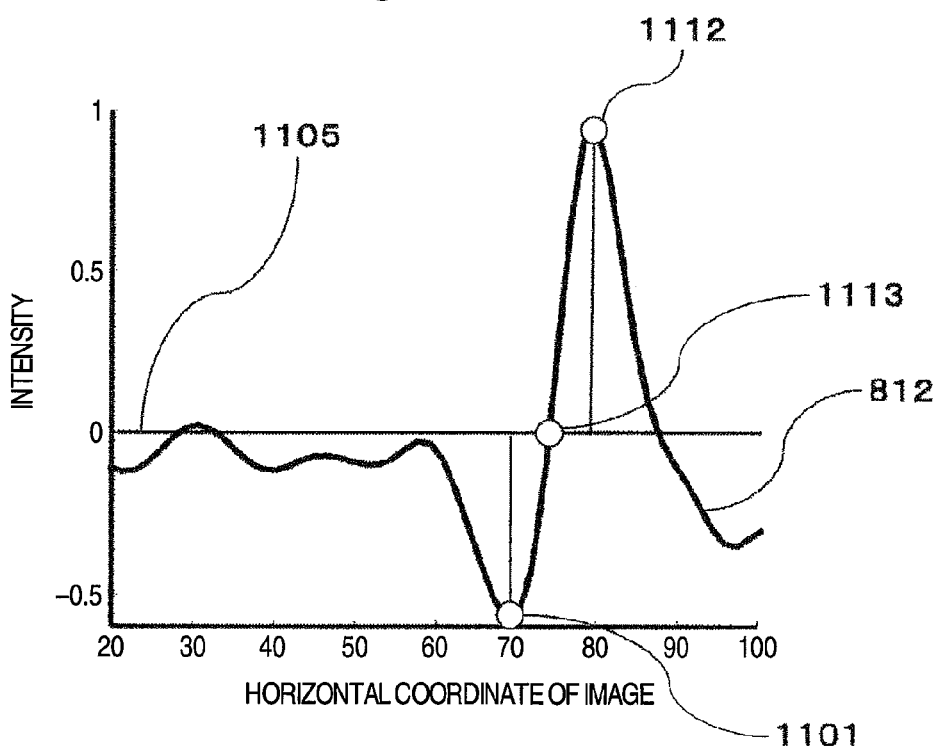
Figure 12A:
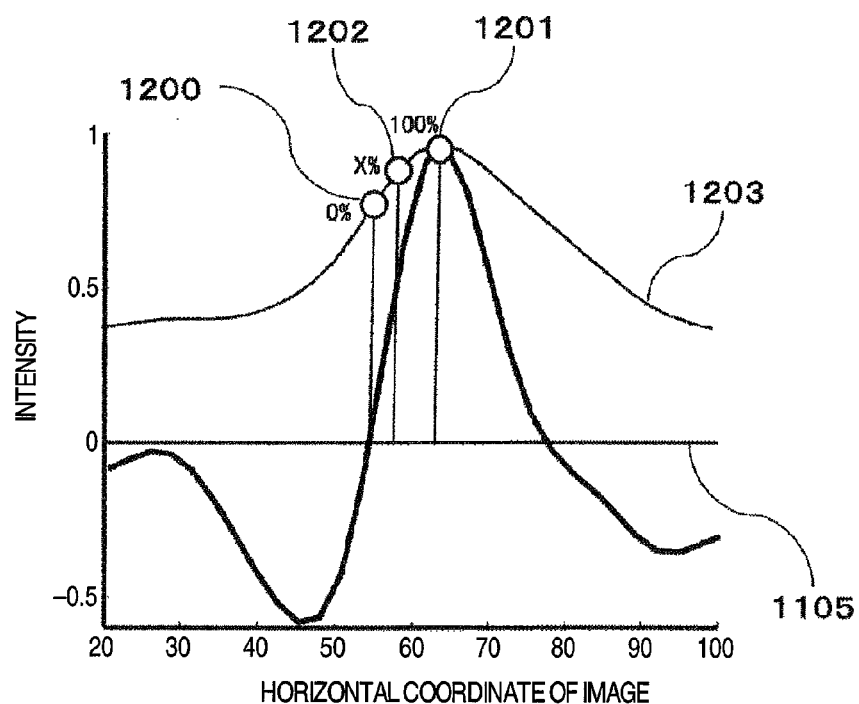
FIGS. 12A and 12B illustrate an intensity based method for estimating a measured contour position with sub-pixel accuracy.
Figure 12B:
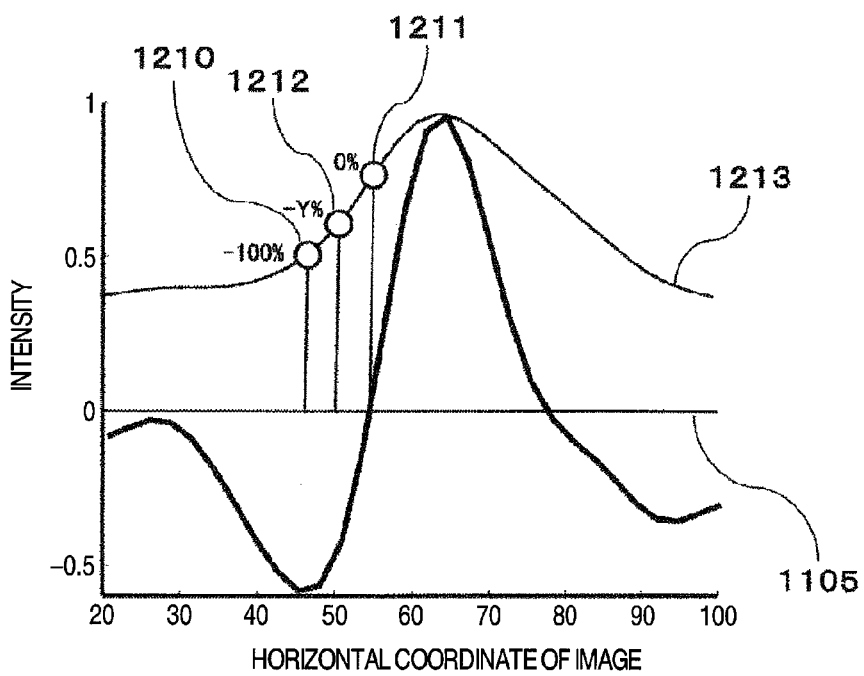

FIG. 11A illustrates a method for estimating with the sub-pixel accuracy a position of a middle point from an intensity profile of the top peak, and FIG. 11B illustrates a method for estimating with the sub-pixel accuracy a position of a middle point from an intensity profile of the bottom peak, respectively. Further, FIG. 12A illustrates a method for estimating the position coordinate value of the measured contour by using the top peak and the middle point as references, and FIG. 12B illustrates a method for estimating the position coordinate value of the measured contour by using the bottom peak and the middle point as references, respectively.

(S1803 in S403: Sub-Pixel Estimation of Top Side Middle Point)

At step S1803, an inflection point 1103 between a top peak 1002 and false bottom peak 1106 as illustrated in FIG. 11A is detected with sub-pixel accuracy. It is noted here that the bottom peak 1106 is a false bottom peak obtained from an image of the hierarchy number "i" and is different from a true bottom peak 1101. Further, there is set to $pmt_{sub}$ the sub-pixel position of the middle point 1103 estimated from the same differential intensity profile f'(x, y, σi) 811 as that of the top peak 1002.

In addition, the position coordinate value $pmt_{sub}$ 1103 being an inflection point is estimated with sub-pixel accuracy as an intersection point of the differential intensity profile f'(x, y, σi) 811 and the zero level 1105. Concretely, a polynomial curve is applied to the differential intensity profile f'(x, y, σi) 811 and an intersection point of the above curve and the zero level 1105 of an intensity level is calculated, thereby estimating the sub-pixel position $pmt_{sub}$ 1103 of the middle point. Here, descriptions will be made with reference to FIGS. 11A and 12A. The middle point on the intensity profile f(x, y, σi) 1203 corresponding to the middle point 1103 on the differential intensity profile f'(x, y, σi) 811 is set to a reference numeral 1202, and similarly the sub-pixel position coordinate value thereof is set to $pt_{pub}$. The process then proceeds to step S1805. Since the middle point is present in a maximum gradient position of the intensity profile, it can be easily detected with high accuracy and is preferable as a reference of measurement.

(S1802 in S403: Sub-Pixel Estimation of Bottom Peak)

Here, for ease of description, a process of step S1802 is illustrated before step S1805. At step S1802, the position $pb_{sub}$ of a true bottom peak 1101 is estimated. On this occasion, the differential intensity profile f'(x, y, σj) obtained from the differential image I'(x, y, σj) is used, thus improving position estimation accuracy. Here, descriptions will be made with reference to FIGS. 11B and 12B. The true bottom peak on the intensity profile f(x, y, σj) 1213 corresponding to the true bottom peak 1101 on the differential intensity profile f'(x, y, σj) 812 is set to a reference numeral 1210, and similarly a sub-pixel position coordinate value thereof is set to $pb_{sub}$. The process then proceeds to step S1804.

(S1804 in S403: Sub-Pixel Estimation of Bottom Side Middle Point)

At step S1804, an inflection point 1113 between a bottom peak 1101 and a top peak 1112 as illustrated in FIG. 11B is detected with sub-pixel accuracy. It is noted here that the top peak 1112 is a false top peak obtained from an image of the hierarchy number "j" and is different from a true top peak 1002. Here, the sub-pixel position 1113 of the middle point estimated from the same differential intensity profile f'(x, y, σj) 812 as that of the bottom peak 1101 is set to $pmb_{sub}$.

In addition, the position coordinate value $pmb_{sub}$ 1113 being an inflection point is estimated with sub-pixel accuracy as an intersection point of the differential intensity profile f'(x, y, σj) 812 and the zero level 1105. Concretely, a polynomial curve is applied to the differential intensity profile f'(x, y, σi) 812, and an intersection point of the above curve and the zero level 1105 of an intensity level is calculated, thereby estimating the sub-pixel position $pmb_{sub}$ of the middle point 1113. Here, descriptions will be made with reference to FIGS. 11B and 12B. The middle point on the intensity profile f(x, y, σj) 1213 corresponding to the middle point 1113 on the differential intensity profile f'(x, y, σj) 812 is set to a reference numeral 1211, and similarly a sub-pixel position coordinate value thereof is set to $pmb_{sub}$. The process then proceeds to step S1806.

(S1805 in S403: Estimation Method Selection of Top Reference Method)

Through the process of steps S1801 and S1803, position coordinate values of the top peak and the middle point are obtained with sub-pixel accuracy. Next, with reference to data of the measurement parameter 533, if the selection box 1515 is checked, the process advances to step S1807. On the other hand, if the selection box 1518 is checked, the process proceeds to step S1808.

(S1806 in S403: Estimation Method Selection of Bottom Reference Method)

Through the process of steps S1802 and S1804, position coordinate values of the bottom peak and the middle point are obtained with sub-pixel accuracy. Next, with reference to data of the measurement parameter 533, if the selection box 1515 is checked, the process advances to step S1809. On the other hand, if the selection box 1518 is checked, the process proceeds to step S1810.

(S1807 in S403: Measured Contour Extraction of Intensity Based Top Reference)

Descriptions will be made with reference to FIG. 12A. The intensity level in a sub-pixel position $pmt_{sub}$ of the middle point 1200 is set to 0% and the intensity level in a top peak position $pt_{sub}$ 1201 is set to 100% to thereby normalize the intensity profile ft(x, y, σi) 1203. Through the process, a normalized intensity profile fn(x, y, σi) is calculated. Based on the data of the measurement parameter 533, a value of the intensity level box 1513 is then called out and a sub-pixel position of the point 1202 of the measurement intensity level X % (−100≤X≤100%) is calculated, thus storing it to a sub-pixel position coordinate value $p_{sub}$ of the measured contour.

In addition, a polynomial curve is applied to the normalized intensity profile fn(x, y, σi) 811 and an intersection point 1202 of the above curve and a surface of the intensity level X % are calculated, thereby estimating the sub-pixel position $p_{sub}$.

In general, since the intensity profile and the differential intensity profile have different value ranges about an intensity value, normalization is performed so as to specify a sub-pixel position with a rate (the above X %).

(S1808 in S403: Measured Contour Extraction of Differential Based Top Reference)

Figure 13A:
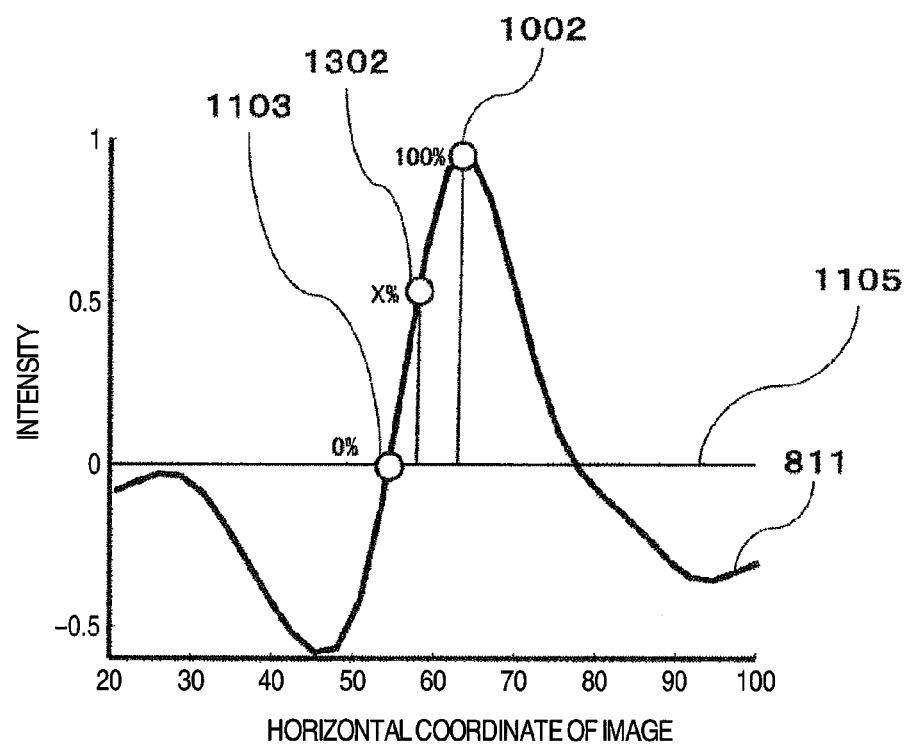
FIGS. 13A and 13B illustrate a differential based method for estimating a measured contour position with sub-pixel accuracy.
Figure 13B:
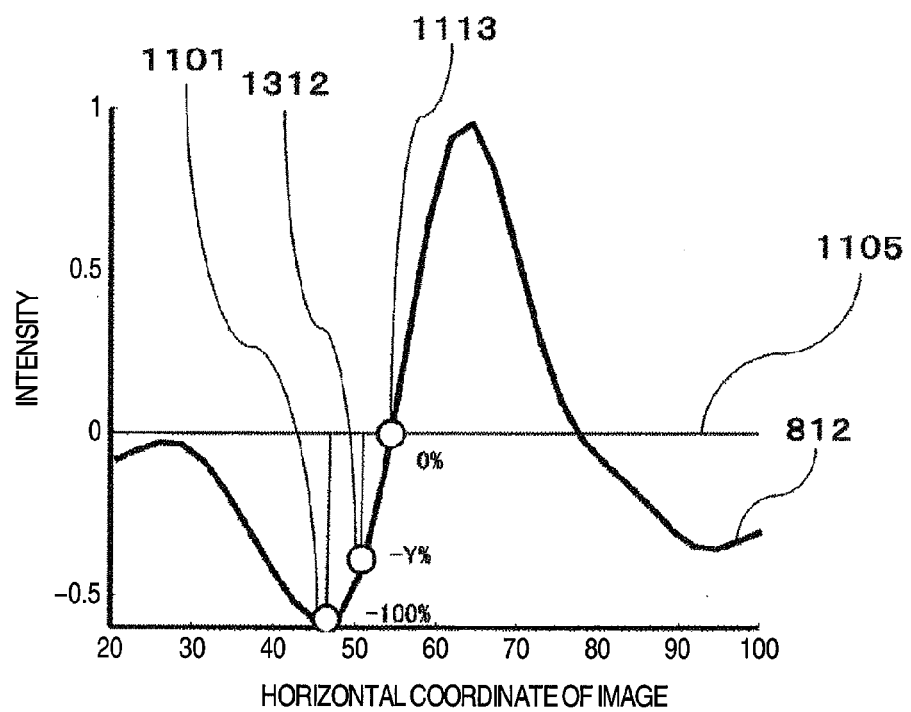

FIG. 13A illustrates a method for estimating a position coordinate value of the measured contour by using the top peak and the middle point as references, and FIG. 13B illustrates a method for estimating a position coordinate value of the measured contour by using the bottom peak and the middle point as references, respectively.

Descriptions will be made with reference to FIG. 13A. The intensity level in a sub-pixel position $pmt_{sub}$ of the middle point 1103 is set to 0% and the intensity level in a sub-pixel position $pt_{sub}$ of the top peak 1002 is set to 100% to thereby normalize the differential intensity profile f'(x, y, σi) 811. Through the process, a normalized differential intensity profile fn'(x, y, σi) is calculated. Based on the data of the measurement parameter 533, a value of the intensity level box 1513 is then called out and a sub-pixel position of the point 1302 of the measurement intensity level X % (−100≤X≤100%) is calculated, thus storing it to a sub-pixel position coordinate value $p_{sub}$ of the measured contour.

In addition, a polynomial curve is applied to the normalized differential intensity profile fn'(x, y, σi), and an intersection point 1302 of the above curve and a surface of the intensity level X % are calculated, thereby estimating the sub-pixel position $p_{sub}$.

(S1809 in S403: Measured Contour Extraction of Intensity Based Bottom Reference)

Descriptions will be made with reference to FIG. 12B. The intensity level in a sub-pixel position $pmb_{sub}$ of the middle point 1211 is set to 0% and the intensity level in a sub-pixel position $pb_{sub}$ of the bottom peak 1210 is set to −100% to thereby normalize the intensity profile f(x, y, σj) 1213. Through the process, a normalized intensity profile fn(x, y, σj) is calculated. Based on the data of the measurement parameter 533, a value of the intensity level box 1516 is then called out and a sub-pixel position of the point 1212 of the measurement intensity level X % (−100≤X≤100%) is calculated, thus storing it to a sub-pixel position coordinate value $p_{sub}$ of the measured contour.

In addition, a polynomial curve is applied to the normalized intensity profile fn(x, y, σj), and an intersection point 1212 of the above curve and a surface of the intensity level X % are calculated, thereby estimating the sub-pixel position $p_{sub}$.

(S1810 in S403: Measured Contour Extraction of Differential Based Bottom Reference)

Descriptions will be made with reference to FIG. 13B. The intensity level in a sub-pixel position $pmb_{sub}$ of the middle point 1113 is set to 0% and the intensity level in a sub-pixel position $pb_{sub}$ of the bottom peak 1111 is set to −100% to thereby normalize the differential intensity profile f'(x, y, σj) 812. Through the process, a normalized differential intensity profile fn'(x, y, σj) is calculated. Based on the data of the measurement parameter 533, a value of the intensity level box 1516 is then called out and a sub-pixel position of the point 1312 of the measurement intensity level X % (−100≤X≤100%) is calculated, thus storing it to a sub-pixel position coordinate value $p_{sub}$ of the measured contour.

In addition, a polynomial curve is applied to the normalized intensity profile fn'(x, y, σj) and an intersection point 1312 of the above curve and a surface of the intensity level X % are calculated, thereby estimating the sub-pixel position $p_{sub}$. Through the above process of step S403, the position coordinate $p_{sub}$ of the measured contour is calculated and the calculated data 536 is stored in the main storage device 510 and the auxiliary storage device 503.

Through the above process of steps S401 to S403, the measured contour can be extracted with higher accuracy by using the method different from conventional methods.

(S404: Correcting Unit of Measured Contour)

At step S404, in addition to the process of steps S401 to S403, there will be described a process of correcting a particularly large error generated due to unexpected noises.

The correcting unit of the measured contour of step S404 in the flowchart of FIG. 4 will be described. It is supposed that the multiple resolution image data 531, the multiple resolution differential image data 532, and the measured contour data 536 are developed previously in the main storage device 510. Hereinafter, there will be described a process flow of the correcting unit program 524 of the measured contour executed by the arithmetic unit 501.

Figure 9A:
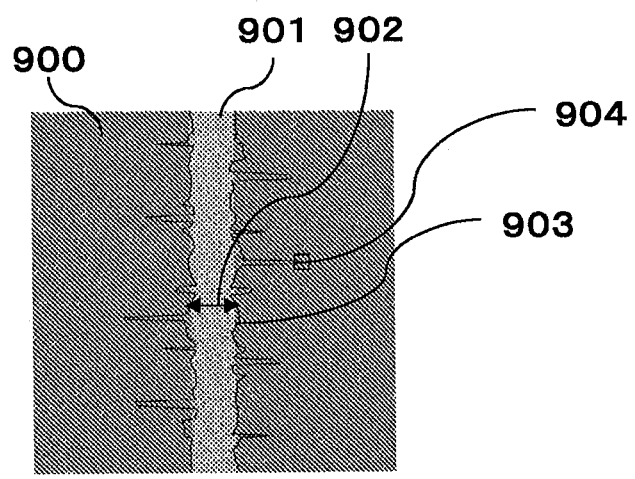
FIGS. 9A and 9B illustrate a flyer correction of a measured contour.

Through the following process, a plurality of position coordinates are considered mutually and a correct measured contour of position coordinates of the measured contour with the sub-pixel accuracy is calculated as a whole. Descriptions will be made with reference to FIG. 9. In the case where noises are contained in an image as in the image 900 of FIG. 9A, when a local process independent for each pixel is performed, flyers (e.g., a point 904) may be detected in a point group 903 of the contour. To solve the above problem, the whole initial contour is globally analyzed to remove the flyers.

First, an energy function E(L) represented by the following formula is given.

(MATH. 6)

$$E(L) = \lambda R(L) + B(L) \quad (6)$$

It is supposed here that the label L={0, 1} includes 1:=inlier (correct measured contour) and 0:=outlier (flyer). A first right-side term is a data term and represents a measured contour level. On the other hand, a second right-side term is a smoothness term and represents an adjacent relationship between pixels. Here, λ represents a hyperparameter for adjusting the first and second terms. By allocating the label L of the above formula appropriately, it is possible to remove flyers contained in the measured contour. Examples of the concrete numerical calculation method include various methods such as graph cut (Hiroshi Ishikawa, "Graph cut", Information Processing Society Research Report, 2007-CVIM-158426), pp. 193-204), belief propagation, and simulated annealing.

From a standpoint of reducing calculation cost, a method for optimizing the above formula by using the graph cut will be described below. First, all points constituting the measured contour are set to nodes (e.g., 905 of FIG. 9B), and edges (e.g., 906 of FIG. 9B) are stretched between adjacent nodes, thus constituting a graph. Then, a special node called a source node (e.g., 907 of FIG. 9B) is added and edges are stretched between all points constituting the measured contour. Finally, a node called a sink node (e.g., 908 of FIG. 9B) is added and edges (e.g., 909 and 910 of FIG. 9B) are stretched between all points $p_{sub}$ constituting the measured contour. The source nodes and the sink nodes are collectively called as terminal nodes.

An energy equal to the first right-side term of the formula (6) is given as a weight of the edge for connecting between terminal nodes and nodes.

(MATH. 7)

$$R(L) = \sum_{v \in V} R_v(L_v) \quad (7)$$

Here, v represents a peak and V represents a set of peaks (point group constituting the measured contour). For convenience, a point group constituting the measured contour is simply called a node, hereinafter.

The above formula (7) is equivalent to a weight of the edge (e.g., 907 and 908 of FIG. 9B) between the terminal node and the node, and sets energy as follows.

(MATH. 8)

$$\text{Weight}_{v,source} = -\log Pr(v, \text{outlier}) \quad (8)$$

(MATH. 9)

$$\text{Weight}_{v,sink} = -\log Pr(v, \text{inlier}) \quad (9)$$

Here, Pr represents a likelihood of the measured contour (or flyers) in the node v. As an example of the likelihood Pr, a contaminated normal distribution may be calculated from a distribution of intensity values of position coordinates of an edge, and used as the likelihood.

Then, an energy equal to the second right-side term of the formula (6) is given as a weight of the edge (e.g., 909 and 910 of FIG. 9B) for connecting between adjacent nodes.

(MATH. 10)

$$B(L) = \sum_{v,v' \in N} B_{v,v'} \delta(L_v, L'_v) \quad (10)$$

Here, the right-side δ function is given by the following formula.

(MATH. 11)

$$\delta(L_v, L'_v) = \begin{cases} 1 & (L_v \neq L'_v) \\ 0 & \text{(otherwise)} \end{cases} \quad (11)$$

The formula (10) is equivalent to the weight of an edge between adjacent nodes and sets the energy as follows.

(MATH. 12)

$$\text{Weight}_{v,v'} = \frac{\exp - (I(v, \sigma_k) - I(v', \sigma_k))^2 / 2\sigma_k^2}{\text{dist}(v, v')} \quad (12)$$

Here, $I(v, \sigma k)$ represents the intensity value of a hierarchy σk in the sub-pixel position coordinate value $p_{sub}$ of the node v. Further, "dist" represents a geometric distance between nodes.

Figure 9B:
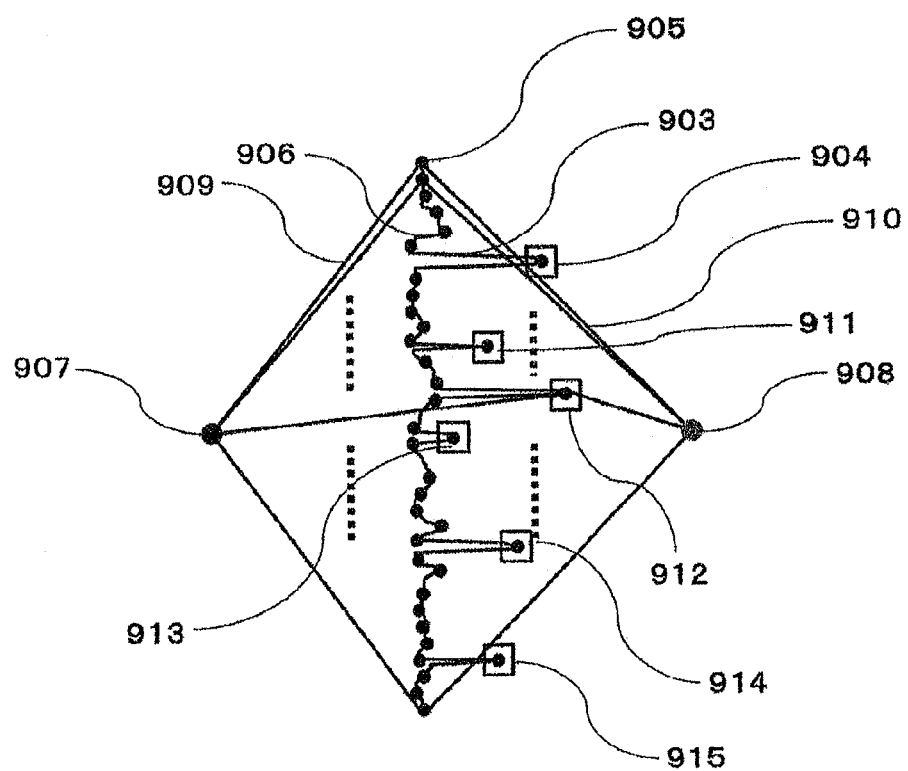

After setting the graph as above, when global minimization is performed by using a maximum flow algorithm, the allocation of a label L for minimizing the formula (6) is calculated. In FIG. 9B, the label L:=0 is allocated to points 904, 911, 912, 913, 914, and 915, and detected as a flyer. Through the process, about the point group (e.g., 904 of FIG. 9B) of a contour viewed as deviant points, when a polynomial curve is applied to ambient contours, interpolation process may be performed. Through the above process of step S404, the position coordinate $p_{sub}$ of the measured contour is updated and the updated data 536 is stored in the main storage device 510 and the auxiliary storage device 503.

(S405: CD Value Calculating Unit)

A calculating unit of CD value of step S405 in the flowchart of FIG. 4 will be described. The measured contour data 536 is supposed to be developed previously in the main storage device 510. Hereinafter, there will be described a process flow of the calculating unit program 525 of CD values executed by the arithmetic unit 501.

Through the process of the steps S401 to S404, the measured contour is calculated. Descriptions will be made with reference to FIG. 14. For example; in the case of the line 101, the line width 102 from the contours 140 and 148; in the case of the lines 103 and 104, the inter-line width 105 from the contours 141 and 142; in the case of the line 106 and the line edge 108, the width 107 between the line edge and the line from the contours 143 and 144; in the case of the line edges 109 and 111, the width 110 between the line edges from the contours 145 and 146; and in the case of the hole 113, the hole span 112 from the contour 147 are calculated as CD values, respectively. The calculated data 537 is stored in the main storage device 510 and the auxiliary storage device 503, and displayed on the display 506. Hereinafter, display contents of the display 506 will be described with reference to FIGS. 15 and 16.

In FIG. 15, the measured border value is extracted by directly using the observed intensity profile. In FIG. 16, the measured border value is extracted by using the differential intensity profile. When the intensity profile is directly used as in FIG. 15, it is suited for a case where devices are adjusted to specialize each device for measurement. When the differential intensity profile is used as in FIG. 16, it is suited for a case where devices are used as a general-purpose measurement method because of avoidance of dependence on them.

FIG. 15A illustrates a result in which a line width 1501 of a circuit pattern image 1510 is measured from a measured contour position of the intensity level specified by a user between the top peak and the middle point. A measurement process is performed over whole area of the semiconductor pattern image 1510. A reference numeral 1502 denotes an intensity profile extracted by using a straight line 1511 as a reference. Similarly, a reference numeral 1503 denotes a differential intensity profile extracted by using the straight line 1511 as the reference. In addition, the intensity profile 1502 and the differential intensity profile 1503 are supposed to be drawn so as to set the straight line 1511 to the intensity level 0. Then, reference numerals 1504 and 1505 correspond to a result of the detection of the top peak position $pt_{sub}$ on the left and right sides of the line, respectively. Reference numerals 1506 and 1507 correspond to a result of the detection of the sub-pixel position $p_{sub}$ of an 80% intensity level on the left and right sides of the line, respectively. Reference numerals 1508 and 1509 correspond to a result of the detection of the middle point position $pmt_{sub}$ on the left and right sides of the line, respectively. In the measurement result 1512, a CD value of the line width 1501 is displayed. In addition, "Mean" of the measurement result 1512 represents the mean of the line width calculated over whole area of the semiconductor pattern image 1510, and similarly "Mean'" represents the trim mean of the line width. Similarly, "Maximum" represents the maximum value of the line width, and "Minimum" represents the minimum value of the line width.

FIG. 15B illustrates a result in which the line width 1521 of the circuit pattern image 1510 is measured from a measured contour position of the intensity level specified by the user between the bottom peak and the middle point. The measurement process is performed over whole area of the semiconductor pattern image 1510. A reference numeral 1522 denotes an intensity profile extracted by using the straight line 1511 as a reference. Similarly, a reference numeral 1523 denotes an intensity profile extracted by using the straight line 1511 as the reference. In addition, the intensity profile 1522 and the differential intensity profile 1523 are supposed to be drawn so as to set the straight line 1511 to the intensity level 0. Then, reference numerals 1524 and 1525 correspond to a result of the detection of the middle point position $pmb_{sub}$ on the left and right sides of the line, respectively. Reference numerals 1526 and 1527 correspond to a result of the detection of the sub-pixel position $p_{sub}$ of an 80% intensity level on the left and right sides of the line, respectively. Reference numerals 1528 and 1529 correspond to a result of the detection of the bottom peak position $pb_{sub}$ on the left and right sides of the line, respectively. In the measurement result 1532, a CD value of the line width 1521 is displayed. In addition, "Mean" of the measurement result 1532 represents a mean of a line width calculated over whole area of the semiconductor pattern image 1510, and similarly "Mean'" represents a trim mean of the line width. Similarly, "Maximum" represents a maximum value of the line width, and "Minimum" represents a minimum value of the line width.

FIG. 16A illustrates a result in which a line width 1601 of the circuit pattern image 1510 is measured from a measured contour position of the differential intensity level specified by the user between the top peak and the middle point. The measurement process is performed over whole area of the semiconductor pattern image 1510. A reference numeral 1602 denotes an intensity profile extracted by using the straight line 1511 as a reference. Similarly, a reference numeral 1603 denotes a differential intensity profile extracted by using the straight line 1511 as the reference. In addition, the intensity profile 1602 and the differential intensity profile 1603 are supposed to be drawn so as to set the straight line 1511 to the intensity level 0. Then, reference numerals 1604 and 1605 correspond to a result of the detection of the top peak position $pt_{sub}$ on the left and right sides of the line, respectively. Reference numerals 1606 and 1607 correspond to a result of the detection of the sub-pixel position $p_{sub}$ of an 80% differential intensity level on the left and right sides of the line, respectively. Reference numerals 1608 and 1609 correspond to a result of the detection of the middle point position $pmt_{sub}$ on the left and right sides of the line, respectively. In the measurement result 1612, a CD value of the line width 1601 is displayed. In addition, "Mean" of the measurement result 1612 represents a mean of a line width calculated over whole area of the semiconductor pattern image 1510, and similarly "Mean'" represents a trim mean of the line width. Similarly, "Maximum" represents a maximum value of the line width, and "Minimum" represents a minimum value of the line width.

FIG. 16B illustrates a result in which a line width 1621 of the circuit pattern image 1510 is measured from a measured contour position of the differential intensity level specified by the user between the bottom peak and the middle point. The measurement process is performed over whole area of the semiconductor pattern image 1510. A reference numeral 1622 denotes an intensity profile extracted by using the straight line 1511 as a reference. Similarly, a reference numeral 1623 denotes a differential intensity profile extracted by using the straight line 1511 as the reference. In addition, the intensity profile 1622 and the differential intensity profile 1623 are supposed to be drawn so as to set the straight line 1511 to the differential intensity level 0. Then, reference numerals 1624 and 1625 correspond to a result of the detection of the middle point position $pmb_{sub}$ on the left and right sides of the line. Reference numerals 1626 and 1629 correspond to a result of the detection of the sub-pixel position $p_{sub}$ of a −80% intensity level on the left and right sides of the line, respectively. Reference numerals 1627 and 1628 correspond to a result of the detection of the bottom peak position $pb_{sub}$ on the left and right sides of the line, respectively. In the measurement result 1632, a CD value of the line width 1621 is displayed. In addition, "Mean" of the measurement result 1621 represents a mean of a line width calculated over whole area of the semiconductor pattern image 1510, and similarly "Mean'" represents a trim mean of the line width. Similarly, "Maximum represents the maximum value of the line width, and "Minimum" represents the minimum value of the line width.

Finally, there will be described a result in which performance is compared in the case where a CD value is measured by using a measurement system in which a pattern measurement process according to the present embodiment is implemented and in the case where a CD value is measured by using a conventional threshold method.

First, measurement reproducibility is defined and a performance evaluation method will be described. An xn-th CD value of certain circuit pattern is set to y={yn|n=1, ..., N}. At this time, measurement reproducibility r(y) is given by the following formula.

(MATH. 13)

$$r(y) = 3\sigma \quad (13)$$

In addition, σ represents a standard deviation and is given by the following formula.

(MATH. 14)

$$\sigma^2 = \frac{1}{N}\sum_{n=1}^{N}(y_n - \bar{y})^2 \quad (14)$$

Here, $\bar{y}$ or a mean of yn is given by the following formula.

(MATH. 15)

$$\bar{y} = \frac{1}{N}\sum_{n=1}^{N}y_n \quad (15)$$

Generally, in an SEM, physical artifacts are generated in an object to be photographed due to repeated irradiation of electron beams. Therefore, a change in an image of the object to be photographed may be mixed into calculation results of measurement reproducibility as some sort of trend. To solve the problem, on the occasion of performance evaluation, the trend is considered to be removed by a linear regression method.

First, when the following formula is solved by using a least-square method, a straight line is applied to a CD value.

(MATH. 16)

$$y_n = ax_n + b \quad (16)$$

A parameter "a" represents a gradient of a straight line, and a parameter "b" represents an intercept of the straight line. Next, the trend is removed by using the following formula.

(MATH. 17)

$$\hat{y}_n = y_n - ax_n - b \quad (17)$$

Then based on the data (MATH. 18)

$$\hat{y} \quad (18)$$

after removing the trend, a measurement reproducibility (MATH. 19)

$$r(\hat{y}) \quad (19)$$

is calculated by using the above formula (13). To improve the reliability of performance evaluation, an experiment is performed by using a plurality of evaluation patterns in which different positions are photographed. With respect to values of the measurement reproducibility calculated in each evaluation pattern, a mean of all the values is calculated to compare the performance of the measurement system according to the present embodiment.

Figure 19A:
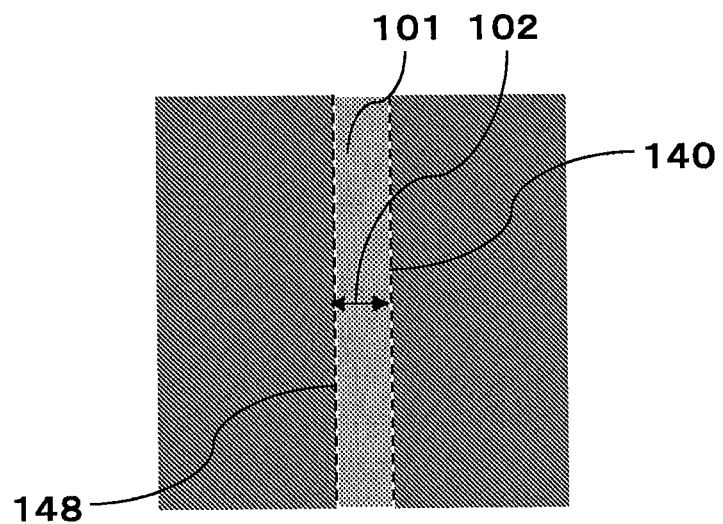

In FIG. 19A, an SEM image for a test pattern used at the time of the evaluation is schematically drawn. In a table of FIG. 19B, mean measurement reproducibility of the entire 10 sets (100=10×10 sheets) is further described. Items of the table will be described. In the "threshold method", measurement results through a method described in JP-A-2001-338304 are represented. In the "differential based measurement", measurement results in the case of using the present embodiment (step S1808 of FIG. 18) are represented. Further, in the "intensity based measurement", measurement results in the case of using the present embodiment (step S1807 of FIG. 18) are represented. In addition, in the table item "smoothing", the number of addition intensity profiles is represented in the case of the threshold method. A half bandwidth of σk in a Gaussian filter for use in the generation of the multiple resolution image is represented in the case of the present embodiment. In the proposed technique, a size of σk is automatically determined in each point constituting the measured contour, and therefore the value has a width. Further, each parameter is optimized so as to output the best measurement reproducibility by using each method.

As described above, with reference to the evaluation results of FIG. 19B, the measurement system according to the present embodiment is better in measurement reproducibility than that of conventional techniques. As is clear from FIG. 19B, the measurement reproducibility is 0.16 nm in the conventional technology, while it is improved up to 0.13~0.15 nm in the present embodiment. This means that an improvement of 18% is realized at maximum by a simple calculation, and a yield rate may be largely improved according to the above fact.

As described above, a pattern measuring system according to the present embodiment does not largely receive an influence of noises due to the photographic device or semiconductor pattern while it can calculate a measured contour of arbitrary intensity level. Further, the measured contour having no mismatch as a whole in the position coordinate values of the measured contour can be calculated. As a result of the above, the measurement reproducibility in the circuit pattern measurement is improved and an improvement in the yield rate can be realized. At the same time, manufacturing control of semiconductor devices finer than before becomes possible.

Finally, a rough flow of the above-described embodiment is illustrated as follows.

(1) To solve the problem, an image obtained by photographing a circuit pattern of a semiconductor device is input and a plurality of noise removing filters are applied to the image to generate a multiple resolution image. Further, an image between hierarchies of the multiple resolution images is subjected to a difference calculation mutually to generate a multiple resolution differential image. Through the plurality of filtering processes, various noises generated according to constituent materials of semiconductor devices, shapes of the circuit patterns, and performance of the photographic device are removed.

(2) Next, a peak of an image signal being a maximal value in the multiple resolution differential image is called a top peak, and a top peak contour is extracted with pixel accuracy as a concatenation of position coordinate values of the top peak. The top peak contour is hard to receive an influence of noises of images and is preferable as a reference at the time of extracting the measured contour of the circuit pattern.

(3) Then, a position coordinate value of the top peak contour is estimated with sub-pixel accuracy and an inflection point near the top peak contour is called a middle point. A position coordinate value of the middle point is estimated with sub-pixel accuracy. Then, both the position coordinate values of the top peak contour and the middle point with strong noises are used as references, thus estimating the measured contour with high accuracy. Concretely, an intensity level in the sub-pixel position coordinate value of the top peak contour is set to 100% and an intensity level in the position coordinate value of the middle point is set to 0% to thereby normalize the intensity profile extracted from the multiple resolution image. Through the process, a concatenation of the sub-pixel position coordinate values of arbitrary intensity levels X % (for example, a selection is performed from a range −100≤X≤100%) is calculated as the measured contour from the normalized intensity profile.

(4) Further, the concatenation of each position coordinate value of a point group constituting the measured contour is viewed as a graph structure. Through the energy optimization process called the graph cut, when the position coordinate value of the measured contour is corrected with sub-pixel accuracy, disorder arising from the influence of noises is removed to correct it.

(5) Finally, a CD value in the circuit pattern of the semiconductor device is calculated from the position coordinate value with sub-pixel accuracy of the measured contour in which the correction process is performed.

Upon describing the above briefly, the present embodiment may be described as follows. Namely, a semiconductor circuit pattern measuring apparatus includes a receiver which receives a semiconductor circuit pattern image transmitted from a photographic device, a multiple resolution image generating unit which applies a plurality of noise removing filters to the semiconductor circuit pattern image received by the receiver and generates a multiple resolution image, a multiple resolution differential image generating unit which generates a multiple resolution differential image from a difference of images between hierarchies of the multiple resolution images, and a contour extracting unit which extracts a contour of the semiconductor circuit pattern based on intensity signals of the semiconductor circuit pattern image. The contour extracting unit calculates an intensity signal level upon extracting the contour of the semiconductor circuit pattern from the multiple resolution image by using an image signal of the multiple resolution differential image, and extracts the contour of the semiconductor circuit pattern based on the calculated intensity signal level.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A semiconductor circuit pattern measuring apparatus comprising:
  a receiver which receives a semiconductor circuit pattern image transmitted from a photographic device;
  a multiple resolution image generating unit which applies a plurality of noise removing filters to the semiconductor circuit pattern image received by the receiver to generate a multiple different resolution images;
  a multiple resolution differential image generating unit which generates a multiple resolution differential image from a difference of images between hierarchies of the multiple different resolution images; and
  a contour extracting unit which extracts a contour of a semiconductor circuit pattern based on an intensity signal of the semiconductor circuit pattern image,
  wherein the contour extracting unit calculates the intensity signal of the semiconductor circuit pattern image using an intensity signal of the multiple resolution differential image,
  wherein the contour extracting unit calculates a top peak in which the intensity signal of the multiple resolution differential image is maximized or a bottom peak in which the intensity signal of the multiple resolution differential image is minimized, and
  wherein the contour extracting unit calculates an inflection point near the top peak or the bottom peak as a middle point, normalizes the intensity signal of the multiple resolution differential image according to the top peak or the bottom peak and the middle point, and extracts the contour of the semiconductor circuit pattern at a position coordinate value corresponding to a specified intensity signal level from the normalized intensity signal.

2. The semiconductor circuit pattern measuring apparatus according to claim 1,
wherein the contour extracting unit calculates the position coordinate value of the top peak or the bottom peak with sub-pixel accuracy.

3. The semiconductor circuit pattern measuring apparatus according to claim 1,
wherein the contour extracting unit calculates the position coordinate value of the middle point with sub-pixel accuracy.

4. The semiconductor circuit pattern measuring apparatus according to claim 1,
wherein the contour extracting unit corrects the extracted contour through an energy optimization process.

5. The semiconductor circuit pattern measuring apparatus according to claim 4,
wherein the contour extracting unit corrects the extracted contour by using a graph cut method.

6. A method for use in a semiconductor circuit pattern measuring apparatus, comprising the steps of:
receiving a semiconductor circuit pattern image transmitted from a photographic device;
applying a plurality of noise removing filters to the received semiconductor circuit pattern image to generate a multiple different resolution images;
generating a multiple resolution differential image from a difference of images between hierarchies of the multiple resolution images; and
extracting a contour of a semiconductor circuit pattern based on an intensity signal of the semiconductor circuit pattern image,
wherein the semiconductor circuit pattern measuring apparatus calculates the intensity signal of the semiconductor circuit pattern image using an intensity signal of the multiple resolution differential image,
wherein the extracting the contour of the semiconductor circuit pattern includes:
calculating at least one of a top peak in which the intensity signal of the multiple resolution differential image is maximized and a bottom peak in which the intensity signal of the multiple resolution differential image is minimized,
calculating an inflection point near at least one of the top peak or the bottom peak as a middle point, and
normalizing the intensity signal of the multiple resolution differential image according to the at least one of the top peak and the bottom peak and the middle point,
wherein the contour of the semiconductor circuit pattern is extracted at a position coordinate value corresponding to a specified intensity signal level from the normalized intensity signal.

7. A semiconductor circuit pattern measuring apparatus comprising:
a receiver which receives a semiconductor circuit pattern image transmitted from a photographic device;
a processor and a memory storing instructions that, when executed by the processor, cause the processor to implement:
a multiple resolution image generating unit which applies a plurality of noise removing filters to the semiconductor circuit pattern image received by the receiver to generate multiple different resolution images;
a multiple resolution differential image generating unit which generates a multiple resolution differential image from a difference of images between hierarchies of the multiple different resolution images; and
a contour extracting unit which extracts a contour of a semiconductor circuit pattern based on an intensity signal of the semiconductor circuit pattern image,
wherein the contour extracting unit calculates the intensity signal of the semiconductor circuit pattern image using an intensity signal of the multiple resolution differential image,
wherein the contour extracting unit calculates at least one of a top peak in which the intensity signal of the multiple resolution differential image is maximized and a bottom peak in which the intensity signal of the multiple resolution differential image is minimized, and
wherein the contour extracting unit calculates an inflection point near the at least one of the top peak and the bottom peak as a middle point, normalizes the intensity signal of the multiple resolution differential image according to the at least one of the top peak and the bottom peak and the middle point, and extracts the contour of the semiconductor circuit pattern at a position coordinate value corresponding to a specified intensity signal level from the normalized intensity signal.

8. The semiconductor circuit pattern measuring apparatus according to claim 7,
wherein the contour extracting unit calculates the position coordinate value of the top peak or the bottom peak with sub-pixel accuracy.

9. The semiconductor circuit pattern measuring apparatus according to claim 7,
wherein the contour extracting unit calculates the position coordinate value of the middle point with sub-pixel accuracy.

10. The semiconductor circuit pattern measuring apparatus according to claim 7,
wherein the contour extracting unit corrects the extracted contour through an energy optimization process.

11. The semiconductor circuit pattern measuring apparatus according to claim 10,
wherein the contour extracting unit corrects the extracted contour by using a graph cut method.

* * * * *